US012327921B2

(12) United States Patent
Jia

(10) Patent No.: US 12,327,921 B2
(45) Date of Patent: Jun. 10, 2025

(54) ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 195 days.

(21) Appl. No.: 17/820,455

(22) Filed: Aug. 17, 2022

(65) Prior Publication Data

US 2022/0399639 A1 Dec. 15, 2022

Related U.S. Application Data

(63) Continuation of application No. PCT/CN2021/073788, filed on Jan. 26, 2021.

(30) Foreign Application Priority Data

Feb. 20, 2020 (CN) ......................... 202010105564.7
Feb. 20, 2020 (CN) ......................... 202020191603.5

(51) Int. Cl.
*H01Q 3/24* (2006.01)
*H01Q 1/24* (2006.01)

(52) U.S. Cl.
CPC ............... *H01Q 3/24* (2013.01); *H01Q 1/241* (2013.01)

(58) Field of Classification Search
CPC .......... H01Q 3/24; H01Q 1/241; H01Q 1/243; H01Q 5/328; H01Q 5/335; H01Q 5/35; H01Q 9/04
See application file for complete search history.

(56) References Cited

U.S. PATENT DOCUMENTS

2013/0201067 A1 8/2013 Hu et al.
2013/0203364 A1* 8/2013 Darnell .................. H01Q 1/243 455/90.3

(Continued)

FOREIGN PATENT DOCUMENTS

CN 102780065 11/2012
CN 104485512 4/2015

(Continued)

OTHER PUBLICATIONS

CNIPA, First Office Action for CN Application No. 202010105564.7, Sep. 27, 2024.

(Continued)

*Primary Examiner* — Dieu Hien T Duong
(74) *Attorney, Agent, or Firm* — Hodgson Russ LLP

(57) ABSTRACT

An electronic device is provided. The electronic device includes a housing, a first excitation source, a second excitation source, a first filtering circuit, and a second filtering circuit. The housing includes a body and an edge frame connected with a periphery of the body, the body defines a first gap, and the edge frame further defines a second gap communicating with the first gap, to divide the edge frame to form a first branch. The first excitation source is configured to feed a first excitation signal to the first branch. The second excitation source is configured to feed a second excitation signal to the first branch. The first filtering circuit is electrically coupled between the first excitation source and the first branch. The second filtering circuit is electrically coupled between the second excitation source and the first branch.

19 Claims, 17 Drawing Sheets

(56) References Cited

U.S. PATENT DOCUMENTS

| | | | | |
|---|---|---|---|---|
| 2016/0365644 | A1 | 12/2016 | Finn et al. | |
| 2017/0244149 | A1 | 8/2017 | Kim et al. | |
| 2019/0237852 | A1 | 8/2019 | Tsou | |
| 2020/0411986 | A1 * | 12/2020 | Cooper | H01Q 9/0421 |

FOREIGN PATENT DOCUMENTS

| | | |
|---|---|---|
| CN | 205039250 | 2/2016 |
| CN | 105428808 | 3/2016 |
| CN | 205543198 | 8/2016 |
| CN | 108281764 | 7/2018 |
| CN | 108321494 | 7/2018 |
| CN | 108470977 | 8/2018 |
| CN | 108511905 | 9/2018 |
| CN | 208522084 | 2/2019 |
| CN | 208589536 | 3/2019 |
| CN | 110247160 | 9/2019 |
| CN | 106374192 | 11/2019 |
| CN | 105958201 | 12/2019 |
| CN | 110571514 | 12/2019 |
| CN | 211556117 | 9/2020 |
| WO | 2019071847 | 4/2019 |

OTHER PUBLICATIONS

WIPO, International Search Report and Written Opinion for PCT/CN2021/073788, Apr. 19, 2021.

EPO, Extended European Search Report for EP Application No. 21756685.0, Jun. 20, 2023.

CNIPA, Second Office Action for CN Application No. 202010105564.7, Feb. 12, 2025.

CNIPA, Decision to refuse for CN Application No. 202010105564.7, Apr. 10, 2025.

* cited by examiner

ELECTRONIC DEVICE

CROSS-REFERENCE TO RELATED APPLICATIONS

This application is a continuation of International Application No. PCT/CN2021/073788, filed Jan. 26, 2021, which claims priority to Chinese Patent Application No. 202010105564.7, filed Feb. 20, 2020, and priority to Chinese Patent Application No. 202020191603.5, filed Feb. 20, 2020, the entire disclosures of which are incorporated herein by reference.

TECHNICAL FIELD

This disclosure relates to the technical field of communications, and in particular to an electronic device.

BACKGROUND

With development of a mobile communication technology, smart phones with a communication function are more and more favored by users. With functions of a smart phone being increasingly more, more and more components are stacked in the smart phone, and less and less space is left for an antenna in the smart phone. The space of the antenna in the smart phone is relatively small, which leads to a limitation to clearance of the antenna and a bandwidth of the antenna. As can be seen that a communication performance of an antenna in a traditional smart phone needs to be improved.

SUMMARY

An electronic device is provided in the present disclosure. The electronic device includes a housing, a first excitation source, a second excitation source, a first filtering circuit, and a second filtering circuit. The housing includes a body and an edge frame connected with a periphery of the body, the body defines a first gap penetrating through two opposite surfaces of the body, the edge frame defines a second gap, the second gap communicates with the first gap, the edge frame is divided by the second gap to form a first branch, and the first branch has a first feeding point and a second feeding point spaced apart from the first feeding point. A length of the first branch between the second feeding point and an end of the first branch adjacent to the second gap is shorter than a length of the first branch between the second feeding point and an end of the first branch away from the second gap. The first excitation source is electrically coupled with the first feeding point and configured to feed a first excitation signal to the first branch, to excite the first branch to resonate in a first frequency band. The second excitation source is electrically coupled with the second feeding point and configured to feed a second excitation signal to the first branch, to excite the first branch to resonate in a second frequency band. The second frequency band is higher than the first frequency band. A first filtering circuit is electrically coupled between the first excitation source and the first feeding point, and configured to filter an interference of an electromagnetic wave signal of the second frequency band to the first excitation source. A second filtering circuit is electrically coupled between the second excitation source and the second feeding point, and configured to filter an interference of an electromagnetic wave signal of the first frequency band to the second excitation source.

BRIEF DESCRIPTION OF THE DRAWINGS

In order to describe technical solutions of the present disclosure more clearly, the following will give a brief introduction to the accompanying drawings used for describing the implementations. Apparently, the accompanying drawings hereinafter described are merely some implementations of the present disclosure. Based on these drawings, those of ordinary skill in the art can also obtain other drawings without creative effort.

DETAILED DESCRIPTION

Figure 1:
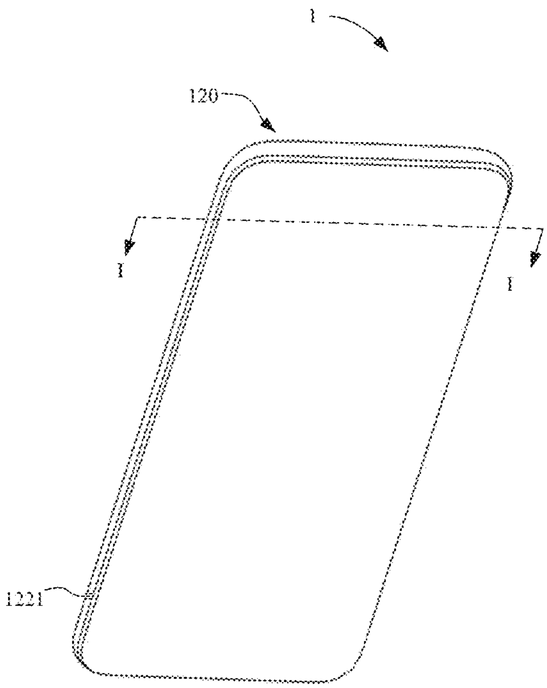
FIG. 1 is a three-dimensional schematic diagram of an electronic device provided in an implementation of the present disclosure.

An electronic device is provided in implementations of the present disclosure. The electronic device includes a housing, a first excitation source, a second excitation source, a first filtering circuit, and a second filtering circuit. The housing includes a body and an edge frame connected with a periphery of the body, the body defines a first gap penetrating through two opposite surfaces of the body, the edge frame defines a second gap, the second gap communicates with the first gap, the edge frame is divided by the second gap to form a first branch, and the first branch has a first feeding point and a second feeding point spaced apart from the first feeding point. A length of the first branch between the second feeding point and an end of the first branch adjacent to the second gap is shorter than a length of the first branch between the second feeding point and an end of the first branch away from the second gap. The first excitation source is electrically coupled with the first feeding point and configured to feed a first excitation signal to the first branch, to excite the first branch to resonate in a first frequency band. The second excitation source is electrically coupled with the second feeding point and configured to feed a second excitation signal to the first branch, to excite the first branch to resonate in a second frequency band. The second frequency band is higher than the first frequency band. The first filtering circuit is electrically coupled between the first excitation source and the first feeding point, and configured to filter an interference of an electromagnetic wave signal of the second frequency band to the first excitation source. The second filtering circuit is electrically coupled between the second excitation source and the second feeding point, and configured to filter an interference of an electromagnetic wave signal of the first frequency band to the second excitation source.

The electronic device further includes a switching circuit. The switching circuit is coupled in parallel with the second filtering circuit and configured to adjust a range of the second frequency band.

A length of the first branch between the second point and an end of the first branch adjacent to the second gap is: $(\lambda_{20}/4)\pm 5$ mm, $\lambda_{20}$ being a wavelength corresponding to a center frequency of the electromagnetic wave signal of the second frequency band.

The electronic device further includes a voltage divider circuit, and the voltage divider circuit has one end electrically coupled with the second excitation source and another end electrically coupled with one of two coupling points not coupled with the first branch, the two coupling points are formed by parallel coupling of the second filtering circuit and the switching circuit.

The voltage divider circuit is configured to coordinate with the second filtering circuit to make a voltage applied to two ends of the switching circuit less than a preset voltage.

The voltage divider circuit and the second filtering circuit each include an inductor.

The switching circuit includes a switch and multiple adjusting sub-circuits, at least one or all of the multiple adjusting sub-circuits is electrically coupled with the first branch through the switch, and the multiple adjusting sub-circuits are configured to adjust the range of the second frequency band.

The second gap is defined corresponding to a non-end portion of the first gap.

The edge frame is further divided by the second gap to form a second branch, the electronic device further includes an adjusting circuit, the adjusting circuit has one end electrically coupled with the second branch and another end grounded, a frequency band of an electromagnetic wave signal received and transmitted through the second branch is different from a frequency band of an electromagnetic wave signal received and transmitted through the first branch, and the adjusting circuit is configured to adjust the frequency band of the electromagnetic wave signal received and transmitted through the second branch.

The edge frame includes a first edge frame and a second edge frame which are connected in a bent manner, the first gap is corresponding to the first edge frame and the second edge frame, the second gap is defined at the second edge frame, a part of the second edge frame corresponding to the first gap is divided by the second gap into a first part and a second part, the first part is connected with the first edge frame, the first branch includes the first part and a part of the first edge frame corresponding to the first gap, and the second part constitutes the second branch.

The first edge frame has a length smaller than the second edge frame, and the second gap is defined at a part of the second edge frame adjacent to the first edge frame.

The edge frame is implemented as at least one edge frame, the first gap is defined corresponding to one of the at least one edge frame, and the second gap is defined at the edge frame corresponding to the first gap.

The electronic device further includes an adjusting circuit, the adjusting circuit has one end electrically coupled with the first branch and another end grounded, and the adjusting circuit is configured to adjust a range of the first frequency band.

The electronic device further includes an impedance matching circuit, the impedance matching circuit has one end electrically coupled with the first excitation source and another end electrically coupled with the first filtering circuit, and the impedance matching circuit is configured to match an output impedance of the first excitation source and an input impedance of the first branch.

A frequency of the first frequency band is less than a frequency of the second frequency band, the second feeding point is more adjacent to the second gap than the first feeding point, the first filtering circuit is a low-pass filtering circuit, and the second filtering circuit is a band-stop filtering circuit.

A frequency of a first frequency band is less than a frequency of a second frequency band, the first branch has a length of $(\lambda_{10}/4)\pm5$ mm, $\lambda_{10}$ being a wavelength corresponding to a center frequency of an electromagnetic wave signal of the first frequency band.

The second gap is defined corresponding to an end portion of the first gap.

The housing is a middle frame or a battery cover.

The first filtering circuit includes a capacitor and an inductor.

The first frequency band includes B5 frequency band, B8 frequency band, B20 frequency band, and B28 frequency band, and the second frequency band includes B1 frequency band, B3 frequency band, B32 frequency band, B40 frequency band, and B41 frequency band.

Technical solutions of implementations of the present disclosure will be described clearly and completely with reference to accompanying drawings in the implementations of the present disclosure below. Apparently, the implementations described herein are merely some implementations, rather than all implementations, of the present disclosure. Based on the implementations of the present disclosure, all other implementations obtained by those of ordinary skill in the art without creative effort shall fall within the protection scope of the present disclosure.

The term "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that the implementations described herein may be combined with other implementations.

Figure 2:
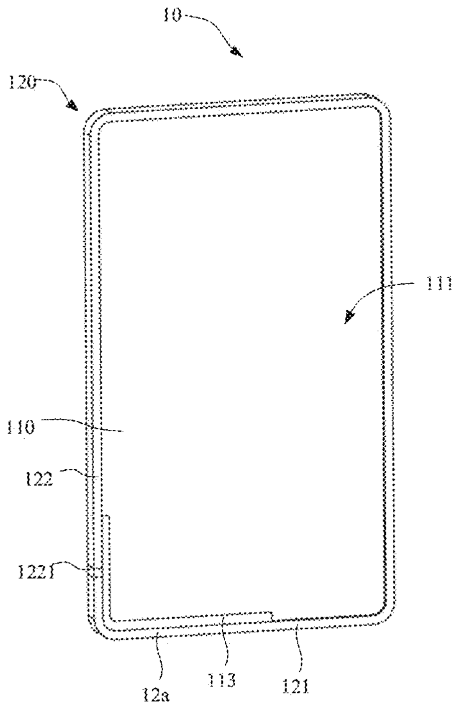
FIG. 2 is a three-dimensional schematic diagram of an electronic device from one angle provided in an implementation of the present disclosure.
Figure 3:
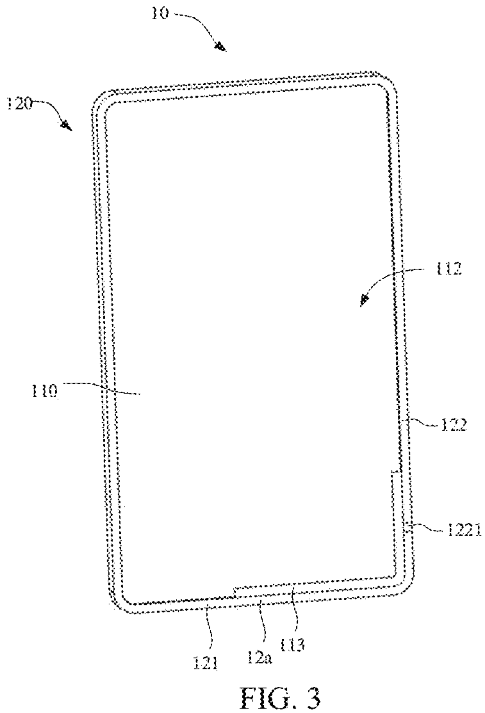
FIG. 3 is a three-dimensional schematic diagram of the middle frame illustrated in FIG. 2 from another angle.
Figure 4:
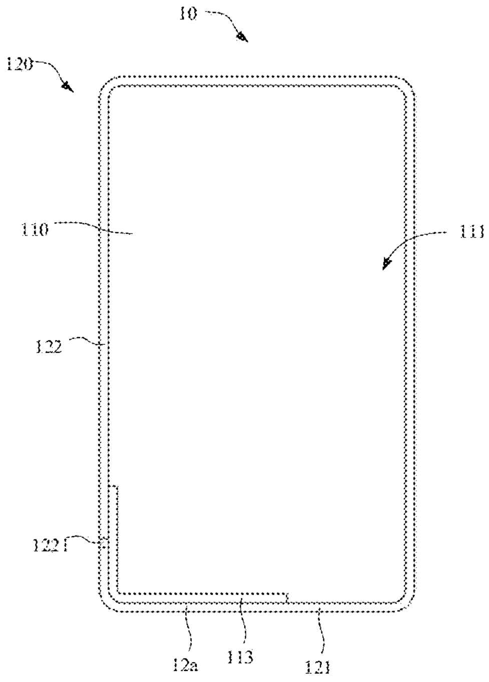
FIG. 4 is a top diagram of a middle frame of an electronic device provided in an implementation of the present disclosure.
Figure 5:
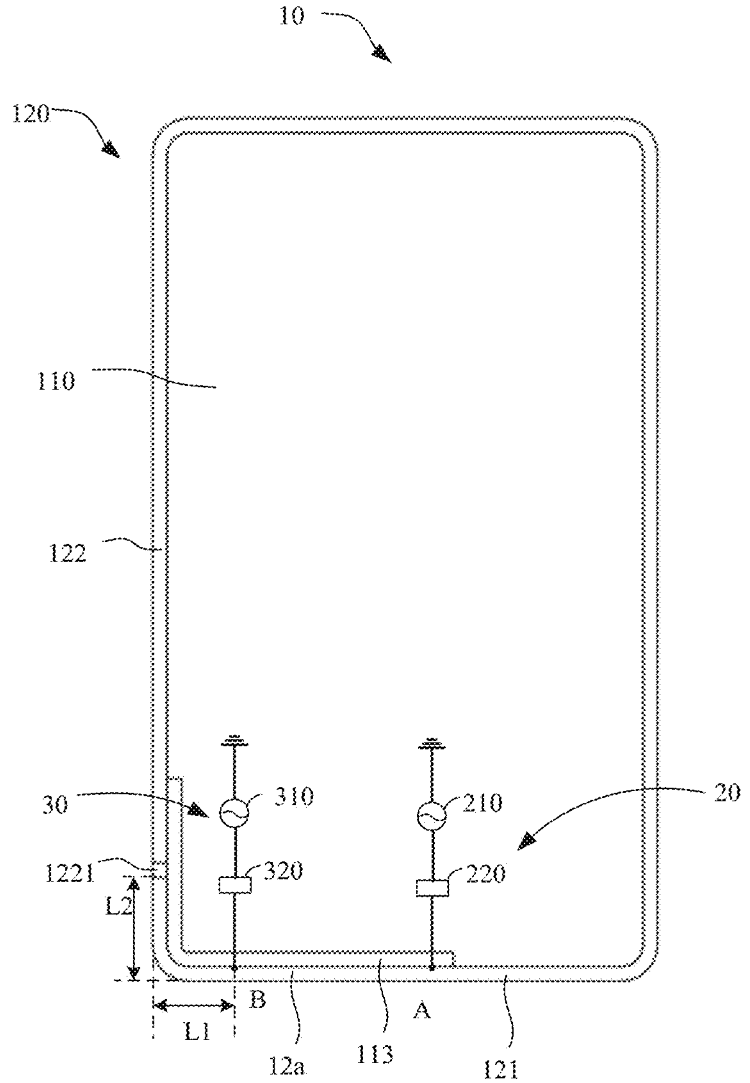
FIG. 5 is a schematic diagram of a first antenna and a second antenna of an electronic device provided in an implementation of the present disclosure.

An electronic device 1 is provided in the present disclosure. The electronic device 1 may be, but is not limited to, any device having a communication function. For example, a tablet computer, a mobile phone, an e-reader, a remote control, a personal computer (PC), a notebook computer, an in-vehicle equipment, an Internet protocol television (IPTV), a wearable device, and other intelligent devices with the communication function. In schematic diagrams of the implementations, for example, the electronic device 1 is a mobile phone. Reference can be made to FIG. 1 to FIG. 5 together, where FIG. 1 is a three-dimensional schematic diagram of an electronic device provided in an implementation of the present disclosure, FIG. 2 is a three-dimensional schematic diagram of an electronic device from one angle provided in an implementation of the present disclosure, FIG. 3 is a three-dimensional schematic diagram of the middle frame illustrated in FIG. 2 from another angle, FIG. 4 is a top diagram of a middle frame of an electronic device provided in an implementation of the present disclosure, and FIG. 5 is a schematic diagram of a first antenna and a second antenna of an electronic device provided in an implementation of the present disclosure. The electronic device 1 includes a middle frame 10, a first excitation source 210, a first filtering circuit 220, a second excitation source 310, and a second filtering circuit 320. The middle frame 10 includes a middle-frame body 110 and an edge frame 120 connected with a periphery of the middle-frame body 110. The middle-frame body 110 defines a first gap 113 penetrating through two opposite surfaces of the middle-frame body 110 along an edge of the middle-frame body 110, the edge frame 120 defines a second gap 1221, and the second gap 1221 communicates with the first gap 113. The edge frame 120 is divided by the second gap 1221 to form a first branch **12*a*. The first branch 12*a* has a first feeding point A and a second feeding point B spaced apart from the first feeding point A. The first excitation source 210 is electrically coupled with the first feeding point A and configured to feed a first excitation signal to the first branch 12*a*, to excite the first branch 12*a* to resonate in a first frequency band. The second excitation source 310 is electrically coupled with the second feeding point B and configured to feed a second excitation signal to the first branch, to excite the first branch 12*a* to resonate in a second frequency band. The second frequency band is higher than the first frequency band. The first filtering circuit 220 is electrically coupled between the first excitation source 210 and the first feeding point A, and configured to filter an interference of an electromagnetic wave signal of the second frequency band to the first excitation source 210. The second filtering circuit 320 is electrically coupled between the second excitation source 310 and the second feeding point B, and configured to filter an interference of an electromagnetic wave signal of the first frequency band to the second excitation source 310**.

It should be noted that "first", "second", etc., in the terms "first gap 113" and "second gap 1221", etc., in the specification, the claims, and the above accompany drawings of the present disclosure are used to distinguish different objects, rather than describe a particular order. In addition, the terms "include", "comprise", and "have" as well as variations thereof are intended to cover a non-exclusive inclusion.

In an implementation, the edge frame 120 includes a first edge frame 121 and a second edge frame 122 which are connected in a bent manner. In other words, the first edge frame 121 is connected with the second edge frame 122, and an included angle is defined between the first edge frame 121 and the second edge frame 122. The first gap 113 corresponds to a part of the first edge frame 121 and a part of the second edge frame 122. The second edge frame 122 is divided by the second gap 1221 into two parts, where a part of the second frame 122 is which are connected with the first edge frame 121 in a bent manner. The part of the second frame which is connected with the first edge frame 121 in a bent manner and the part of the first edge frame 121 corresponding to the first gap 113 constitute the first branch **12*a***.

In the schematic diagrams of the implementations, for example, the first edge frame 121 is a short edge frame of the electronic device 1, and the second edge frame 122 is a long edge frame of the electronic device 1. It can be understood that in other implementations, the first edge frame 121 may also have the same length as the second edge frame 122, or have a length smaller than the second edge frame 122.

The middle frame 10 is made of a conductive material. For example, the middle frame 10 may be, but is not limited to, made of magnesium aluminum alloy. The middle frame 10 is substantially rectangular. In the implementations of the present disclosure, for example, the middle frame 10 includes the first edge frame 121 and the second edge frame 122 connected with the first edge frame 121, but it can be understood that the middle frame 10 can further include other edge frames 120. In the electronic device 1, the edge frame 120 may include other edge frames in addition to the first frame 121 and the second frame 122, and all edge frames 120 in the middle frame 10 may be sequentially connected end to end and be connected with the periphery of the middle-frame body 10.

In an implementation, the middle frame 10 may also be injected with an insulating material, and the insulating material may be, but is not limited to, plastic. A specific structure of the middle frame 10 is not limited by the present disclosure, as long as the middle frame 10 includes the middle-frame body 110 and the edge frame 120 disposed at the periphery of the middle-frame body 110.

In the implementations, for example, the first gap 113 and the second gap 1221 are filled with non-electromagnetic shielding materials. In other implementations, the first gap 113 and the second gap 1221 may also be not filled with the non-electromagnetic shielding materials. The non-electromagnetic shielding materials may be, but is not limited to, plastic, etc.

Figure 6:
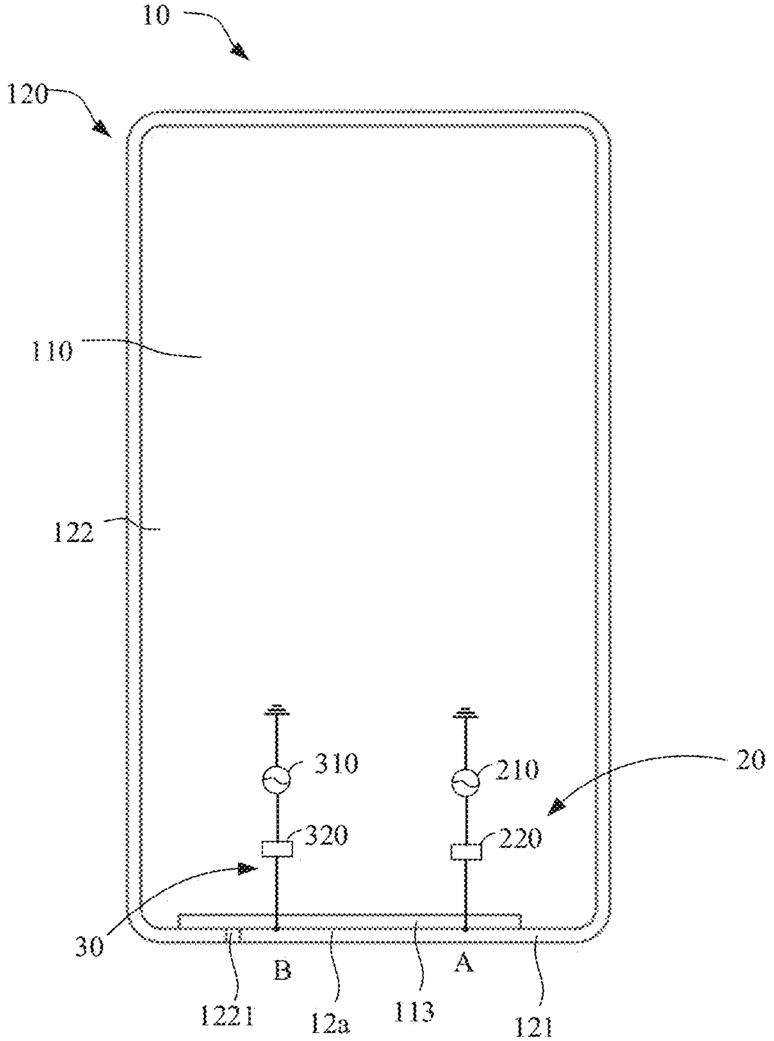
FIG. 6 is a top diagram of a middle frame of an electronic device provided in another implementation of the present disclosure.

It can be understood that in other implementations, reference can be made to FIG. 6, which is a top diagram of a middle frame of an electronic device provided in another implementation of the present disclosure. In the implementations, the middle frame 10 includes the middle-frame body 10 and at least one edge frame 120 which are connected in a bent manner and the at least one edge frame 120 is connected with a periphery the middle-frame body 110. The first gap 113 is defined corresponding to one of the at least one edge frame 120, and the second gap 1221 is defined at the edge frame 120 corresponding to the first gap 113. In a schematic diagram of the implementations, an edge frame 120 includes the first edge frame 121 and the second edge frame 122 which are connected in a bent manner. The first gap 113 is only defined corresponding to the first edge frame 121, the second gap 1221 is also defined corresponding to the first edge frame 121, and the second gap 1221 communicates with the first gap 113. In other words, the first edge frame 121 is divided by the second gap 1221 into two parts, and the second gap 1221 communicates with the first gap 113.

In following implementations, for example, the first gap 113 is corresponding to the first edge frame 121 and the second edge frame 122 which are connected in a bent manner, and the second gap 1221 is defined at the second edge frame 122.

The first excitation source 210 is electrically coupled with the first feeding point A away from the second gap 1221 to constitute the first antenna 20. The first antenna 20 is configured to receive and transmit the electromagnetic wave signal of the first frequency band through the first branch 12*a*. When the first antenna 20 is configured to transmit the electromagnetic wave signal of the first frequency band, the first excitation source 210 is configured to generate the first excitation signal, the first excitation signal is applied to the first branch 12*a* through the first filtering circuit 220, and the first branch 12*a* is configured to convert the first excitation signal into the electromagnetic wave signal of the first frequency band and radiate it out. The first filtering circuit 220 is configured to filter the interference of the electromagnetic wave signal of the second frequency band of the second antenna 30 to the first antenna 20.

The second excitation source 310 is electrically coupled with the second filtering circuit 320 and the second filtering circuit 320 is electrically coupled with the second feeding point adjacent to the second gap 1221, to constitute the second antenna 30. The second antenna 30 is configured to receive and transmit the electromagnetic wave signal of the second frequency band through the first branch 12*a*. When the second antenna 30 is configured to transmit the electromagnetic wave signal of the second frequency band, the second excitation source 310 is configured to generate the second excitation signal, the second excitation signal is applied to the first branch 12*a* through the second filtering circuit 320, and the first branch 12*a* is configured to convert the second excitation signal into the electromagnetic wave signal of the second frequency band and radiate it out. The second filtering circuit 320 is configured to filter the interference of the electromagnetic wave signal of the first frequency band of the first antenna 20 to the second antenna 30.

In an implementation, the first filtering circuit 220 includes a capacitor and an inductor, and the second filtering circuit 320 includes an inductor.

In an implementation, the first frequency band is a low frequency band of a current communication frequency band, and the first frequency band is: 0.7 GHz≤f1≤0.96 GHz. The second frequency band is a medium and high frequency band of the current communication frequency band, and the second frequency band f2 is: 1.45 GHz≤f2≤2.69 GHz. Accordingly, the first filtering circuit 220 is a low-pass filtering circuit, and the second filtering circuit 320 is a band-stop filtering circuit. A frequency-band range covered by the first frequency band includes B5 frequency band, B8 frequency band, B20 frequency band, and B28 frequency band. When the first frequency band is B5 frequency band, the first frequency band f1 satisfies: 824 MHz≤f1≤894 MHz; when the first frequency band is B8 frequency band, the first frequency band f1 satisfies: 880 MHz≤f1≤960 MHz; when the first frequency band is B20 frequency band, the first frequency band f1 satisfies: 791 GHz≤f1≤862 MHZ; and when the first frequency band is B28 frequency band, the first frequency band f1 satisfies: 704 MHz≤f1≤803 MHz. A range covered by the second frequency band includes B1 frequency band, B3 frequency band, B32 frequency band, B40 frequency band, and B41 frequency band. When the second frequency band is B1 frequency band, the second frequency band f2 satisfies: 1.92 GHz≤f2≤2.17 GHz; when the second frequency band is B3 frequency band, the second frequency band f2 satisfies: 1.71 GHz≤f2≤1.88 GHz; when the second frequency band is B32 frequency band, the second frequency band f2 satisfies: 1.45 GHz≤f2≤1.5 GHz; when the second frequency band is B40 frequency band, the second frequency band f2 satisfies: 2.3 GHz≤f2≤2.4 GHz; when the second frequency band is B41 frequency band, the second frequency band f2 satisfies: 2.5 GHz≤f2≤2.69 GHz.

Compared with the related art, in the electronic device 1 of the present disclosure, the edge frame 120 of the middle frame 10 is used as the first branch 12*a*, and the same first branch 12*a* is used to form the first antenna 20 and the second antenna 30, and an interference between the first antenna 20 and the second antenna 30 is avoided by the first filtering circuit 220 and the second filtering circuit 320, thus realizing isolation between the first antenna 20 and the second antenna 30. Therefore, the electronic device 1 of the present disclosure can realize relatively large frequency-band coverage in a limited space, realize a relatively large bandwidth, and have a relatively high communication performance.

Figure 7:
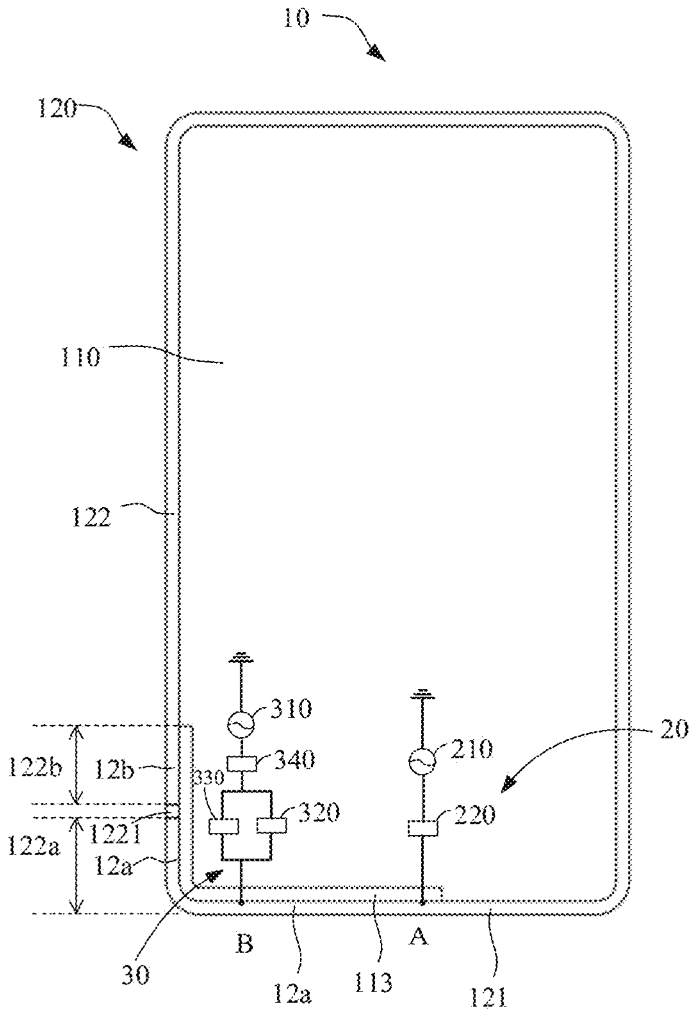
FIG. 7 is a schematic diagram of a first antenna and a second antenna of an electronic device provided in another implementation of the present disclosure.

Reference can be made to FIG. 7, which is a schematic diagram of a first antenna and a second antenna of an electronic device provided in another implementation of the present disclosure. In an implementation, the electronic device 1 further includes a switching circuit 330, the switching circuit 330 is coupled in parallel with the second filtering circuit 320, and the switching circuit 330 is configured to adjust a range of the second frequency band. In the schematic diagram, for example, the electronic device 1 includes the electronic device 1 illustrated in FIG. 5 in combination with the switching circuit 330.

Figure 8:
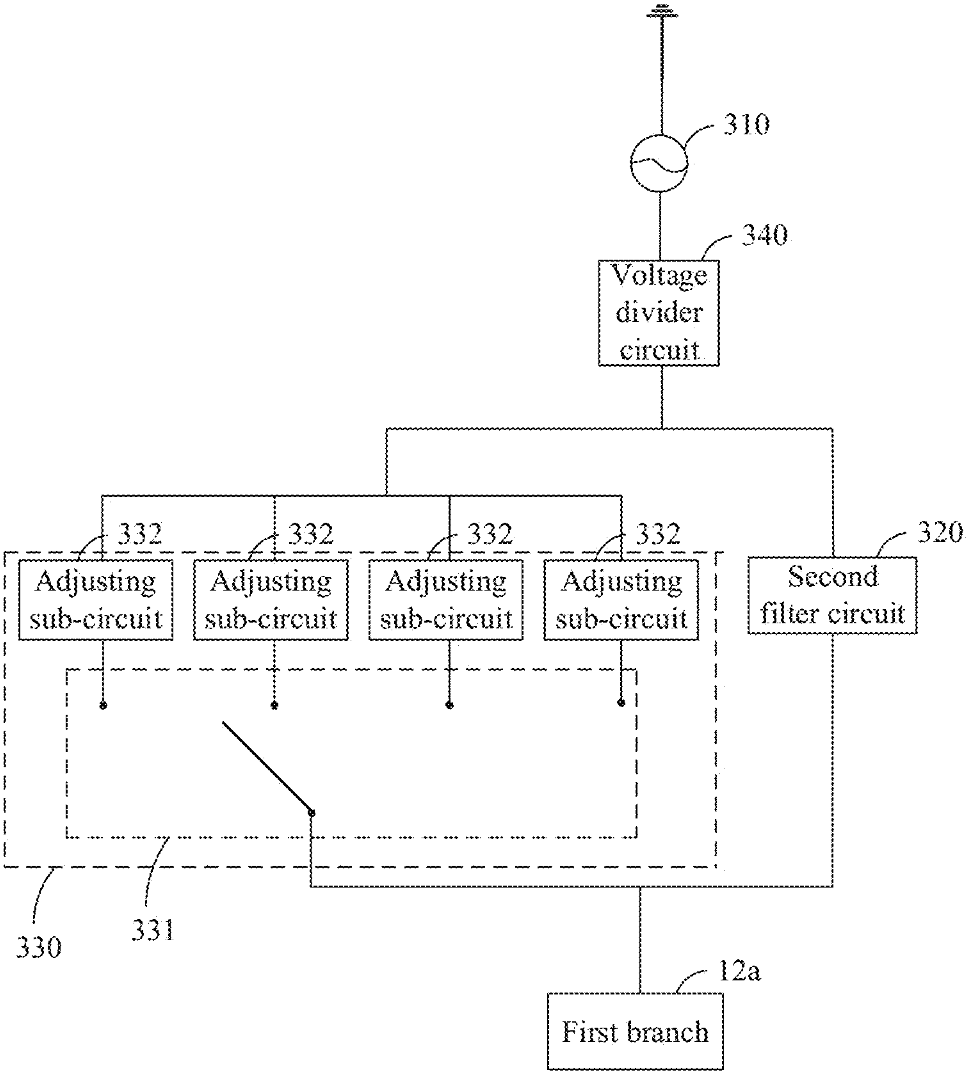
FIG. 8 is a schematic diagram of a switching circuit in FIG. 7 provided in an implementation.

Reference can be made to FIG. 8, which is a schematic diagram of a switching circuit in FIG. 7 provided in an implementation. The switching circuit 330 includes a switch 331 and multiple adjusting sub-circuits 332, at least one or all of the multiple adjusting sub-circuits 332 is electrically coupled with the first branch 12*a* through the switch, and the multiple adjusting sub-circuits 332 are configured to adjust the range of the second frequency band.

The switch 331 may be an N of M selector switch, where M>N, and both M and N are positive integers. For example, M=4, N=2, or M=4, N=1. Each adjusting sub-circuit 332 includes at least one capacitor. In the schematic diagram of the implementations, for example, the switch 331 is a 1 of 4 selector switch, and the switching circuit 330 includes four adjusting sub-circuits 332 which are coupled in parallel.

When the electronic device 1 includes the switching circuit 330 and the first antenna 20 is operating, the first excitation signal generated by the first excitation source 210 is transmitted to the first branch 12*a* through the low-pass filtering circuit. In this case, the switch 331 of the second antenna 30 is in an off state. The first filtering circuit 220 is configured to filter the interference of an electromagnetic wave of the second frequency band to the first antenna 20. For example, when the first frequency band f1 is: 0.7 GHz≤f1≤0.96 GHz, and the second frequency band f2 is: 1.45 GHz≤f2≤2.69 GHz, the first filtering circuit 220 is configured to filter an electromagnetic energy with frequency band f2 of 1.45 GHz≤f2≤2.69 GHz, so as to avoid an influence of the electromagnetic energy of 1.45 GHz≤f2≤2.69 on the first excitation source 210.

In an implementation, a length of the first branch 12*a* between the second feeding point B of the first branch 12*a* electrically coupled with the second excitation source 310 and an end of the first branch 12*a* adjacent to the second gap 1221 is: $(\lambda_{20}/4)\pm5$ mm, $\lambda_{20}$ being a wavelength corresponding to a center frequency of the electromagnetic wave signal of the second frequency band.

An electrical coupling point where the switching circuit 330 is electrically coupled with the first branch 12*a* is the feeding point of the first branch 12*a* electrically coupled with the second excitation source 310. For convenience of description, a coupling point where the first branch 12*a* is electrically coupled with the first excitation source 210 is named as a first feeding point A (as illustrated in FIG. 5 to FIG. 7), and a coupling point where the first branch 12*a* electrically is coupled with the second excitation source 310 is named as a second feeding point B (as illustrated in FIG. 5 to FIG. 7). Reference can be made to FIG. 5 again, a length L of the first branch 12*a* between a coupling point where the first branch 12*a* is electrically coupled with the switching circuit 330 and the end of the first branch 12*a* adjacent to the second gap 1221 is equal to L1+L2, where L1 is equal to a length from the second feeding point B to a connection position of the first edge frame 121 and the second edge frame 122 in the first branch 12*a*, and L2 is equal to a length of the second edge frame 122 in the first branch 12*a*.

It can be understood that in other implementations, when the first gap 113 is only defined corresponding to the first edge frame 121 and the second gap 1221 correspondingly penetrates through the first frame 121 and communicates with the first gap 113, a length of the first branch 12*a* between the coupling point where the first branch 12*a* is electrically coupled with the switching circuit 330 and the end of the first branch 12*a* adjacent to the second gap 1221 is equal to a length from the second feeding point B to the end of the first branch 12*a* adjacent to the second gap 1221.

When the length L of the first branch 12*a* between the coupling point where the first branch 12*a* is electrically coupled with the switching circuit 330 and the end of the first branch 12*a* adjacent to the second gap 1221 is: $(\lambda_{20}/4)\pm5$ mm, $\lambda_{20}$ being the wavelength corresponding to the center frequency of the electromagnetic wave signal of the second frequency band, in this case, an electrical length of the first branch 12*a* for receiving and transmitting the electromagnetic wave signal of the second frequency band just matches a center frequency of the radiated electromagnetic wave signal of the second frequency band, such that the first branch 12*a* has a relatively great reception and transmission effect when receiving and transmitting the electromagnetic wave signal of the second frequency band. When the second frequency band f2 is 1.45≤f2≤2.69 GHz, the center frequency of the second frequency band is $f_{20}$=[(1.45+2.69)/2] GHz, where $\lambda_{20}=1/f_{20}$.

The switching circuit 330 is coupled in parallel with the second filtering circuit 320 to form two coupling points, one coupling point is electrically coupled with a first branch 12*a*, another coupling point is not coupled with the first branch 12*a*. The electronic device 1 further includes a voltage divider circuit 340. The voltage divider circuit 340 has one end electrically coupled with the second excitation source 310 and another end electrically coupled with one of two coupling points not coupled with the first branch 12*a*, the two coupling points are formed by parallel coupling of the switching circuit 330 and the second filtering circuit 320. The voltage divider circuit 340 is configured to coordinate with the second filtering circuit 320 to make a voltage applied to two ends of the switching circuit 330 less than a preset voltage. In the schematic diagram of the implementations, for example, the second antenna 30 includes both the switching circuit 330 and the voltage divider circuit 340. It can be understood that, the second antenna 30 may only include the switching circuit 330 or the voltage divider circuit 340.

In an implementation, the voltage divider circuit 340 includes at least one inductor. When the voltage divider circuit 340 includes multiple inductors, the multiple inductors can be coupled in series or in parallel, or partially in series and partially in parallel. The second filtering circuit 320 includes an inductor. The voltage divider circuit 340 includes an inductor, and the second filtering circuit 320 also includes an inductor, therefore, a voltage caused by the second excitation source 310 will not be fully applied to the switching circuit 330, and the voltage caused by the second excitation source 310 will be shared by the voltage divider circuit 340, thereby reducing the voltage across the switching circuit 330, which helps to improve stability of the switching circuit 330.

Figure 9:
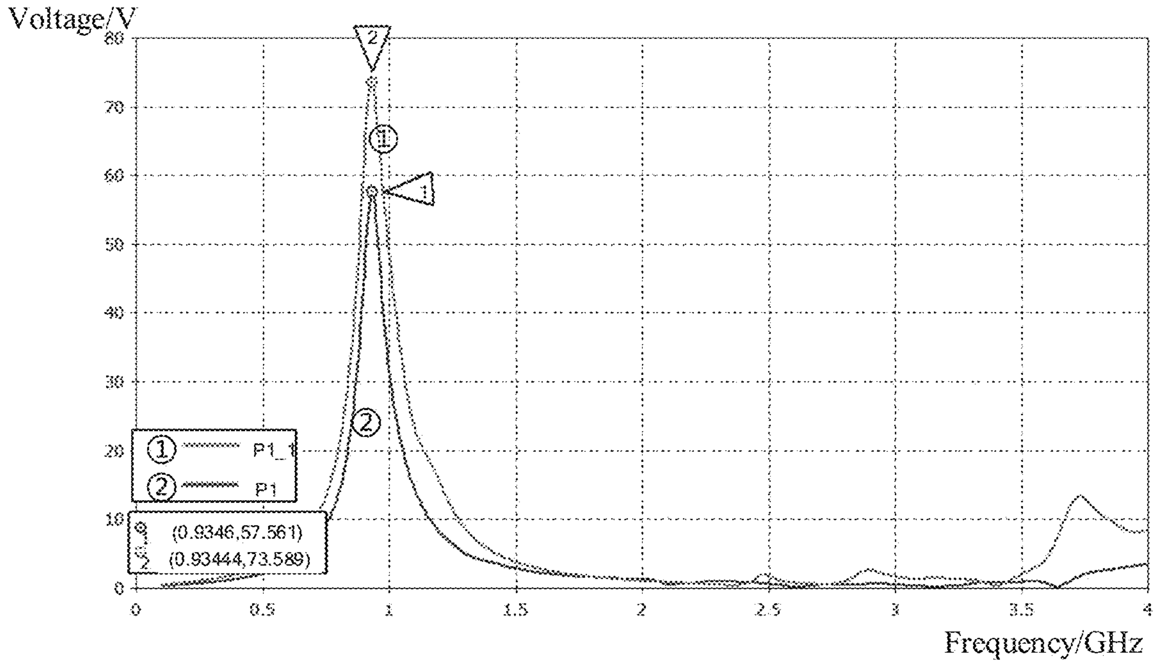
FIG. 9 is a schematic simulation diagram of a voltage across a switching circuit when a second antenna includes a voltage divider circuit and a voltage across the switching circuit when the second antenna does not include the voltage divider circuit.

Reference can be made to FIG. 9, which is a schematic simulation diagram of a voltage across a switching circuit when a second antenna includes a voltage divider circuit and a voltage across the switching circuit when the second antenna does not include the voltage divider circuit. In FIG. 9, a horizontal axis represents a frequency in units of GHz, and a vertical axis represents a voltage in units of V. In the schematic diagram, curve ① represents a schematic simulation diagram of a voltage across the switching circuit 330 when the voltage divider circuit 340 is not included. Curve ② is a schematic simulation diagram of the voltage across the switching circuit 330 when the voltage divider circuit 340 is included. In the schematic diagram, when the second antenna 30 operates at an identical frequency, a larger value of the vertical axis represents a higher voltage across the switching circuit 330. It can be seen from the schematic diagram that a voltage value of curve ① is basically greater than a voltage value of curve ②. Particularly, the voltage value at the vertex of curve ① is 73.6 V, and the voltage value at the vertex of curve ② (at the same frequency point as the vertex of curve ①) is 57.5 V. It can be seen that after the voltage divider circuit 340 is added, the voltage across the switching circuit 330 decreases by a relatively great amount of 21.9%.

Figure 10:
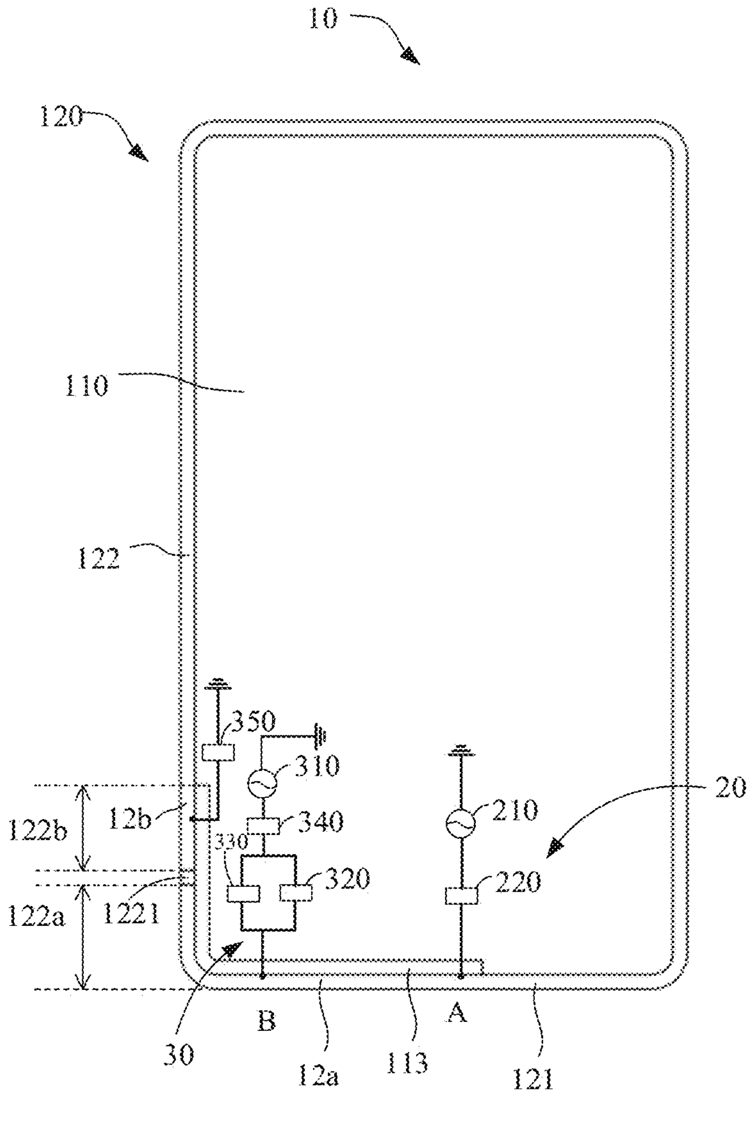
FIG. 10 is a schematic diagram of a first antenna and a second antenna of an electronic device provided in another implementation of the present disclosure.

Reference can be made to FIG. 10, which is a schematic diagram of a first antenna and a second antenna of an electronic device provided in another implementation of the present disclosure. The second gap 1221 is defined corresponding to a non-end portion of the first gap 113, and the edge frame 120 is further divided by the second gap 1221 to form the second branch 12*b*. In other words, the second gap 1221 is defined corresponding to the first gap 113 to make the edge frame 120 corresponding to the first gap 113 divided by the second gap 1221 to form the first branch 12*a* and the second branch 12*b*. The electronic device 1 further includes a first adjusting circuit 350, and the first adjusting circuit 350 has one end electrically coupled with the second branch 12*b* and another end grounded. A frequency band of an electromagnetic wave signal received and transmitted through the second branch 12*b* is different from a frequency band of an electromagnetic wave signal received and transmitted through the first branch 12*a*. The first adjusting circuit 350 is configured to adjust the frequency band of the electromagnetic wave signal received and transmitted through the second branch 12*b*.

The second branch 12*b* is also referred to as a parasitic branch, and the first adjusting circuit 350 includes an adjusting capacitor.

The frequency band of the electromagnetic wave signal received and transmitted by the second antenna 30 through the second branch 12*b* is different from the frequency band of the electromagnetic wave signal received and transmitted by the second antenna 30 through the first branch 12*a*, such that the second antenna 30 can meet requirements of a carrier aggregation (CA) technology. The CA technology requires that the electronic device 1 has a relatively large bandwidth. For example, the CA technology requires that the electronic device 1 can support B1 frequency band and B41 frequency band, the second antenna 30 can realize communication of B1 frequency band through the first branch 12*a*, and the second antenna 30 can realize communication of B41 frequency band through the second branch 12*b* and the first adjusting circuit 350. It can be seen that the electronic device 1 divides the edge frame 120 to form the second branch 12*b*, which makes full use of the edge frame 120 of the electronic device 1, and meets a demand for a relatively large bandwidth in a limited space of the electronic device 1 with cooperation of the first adjusting circuit 350, thereby meeting the requirements of the CA technology.

In the implementations, the edge frame 120 includes the first edge frame 121 and the second edge frame 122 which are connected in a bent manner, and the first gap 113 is corresponding to the first edge frame 121 and the second edge frame 122. The second gap 1221 is defined at the second edge frame 122, a part of the second edge frame 122 corresponding to the first gap 113 is divided by the second gap 1221 into a first part 122*a* and a second part 122*b*, the first part 122*a* is connected with the first edge frame 121, the first branch 12*a* includes the first part 122*a* and a part of the first edge frame 121 corresponding to the first gap 113, and the second part 122*b* constitutes the second branch 12*b*.

In the schematic diagram of the implementations, the second branch 12*b* includes a part of the second edge frame 122 which is corresponding to the first gap 113 and located above the second gap 1221. In other words, the second branch 12*b* includes the second part 122*b*.

Figure 11:
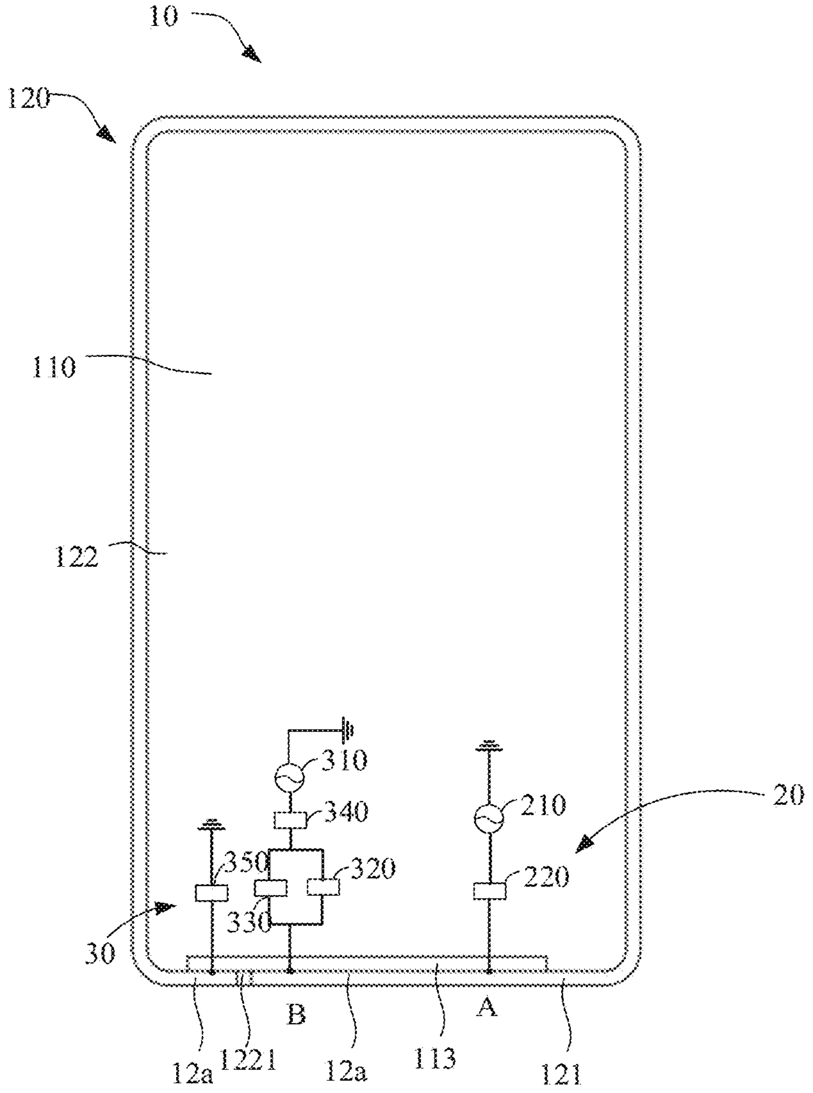
FIG. 11 is a schematic diagram of a first antenna and a second antenna of an electronic device provided in yet another implementation of the present disclosure.

Reference can be made to FIG. 11, which is a schematic diagram of a first antenna and a second antenna of an electronic device provided in yet another implementation of the present disclosure. A structure of the electronic device 1 provided in the implementation is basically identical to a structure of the electronic device 1 provided in FIG. 10 and related descriptions, except that the first gap 113 is defined corresponding to one of edge frames 120 and the second gap 1221 is defined on the edge frame 120 corresponding to the first gap 113.

In the schematic diagram of the implementation, for example, the first gap 113 and the second gap 1221 are corresponding to a short edge frame 120 of the electronic device 1. It can be understood that in other implementations, the first gap 113 and the second gap 1221 may also be defined corresponding to a long edge frame 120 of the electronic device 1. In the implementation, the first branch 12*a* includes a part of the first frame 121 located at the right side of the second gap 1221 and below the first gap 113. Accordingly, the second branch 12*b* includes a part of the first frame 121 located at the left side of the second gap 1221 and below the first gap 113.

Figure 12:
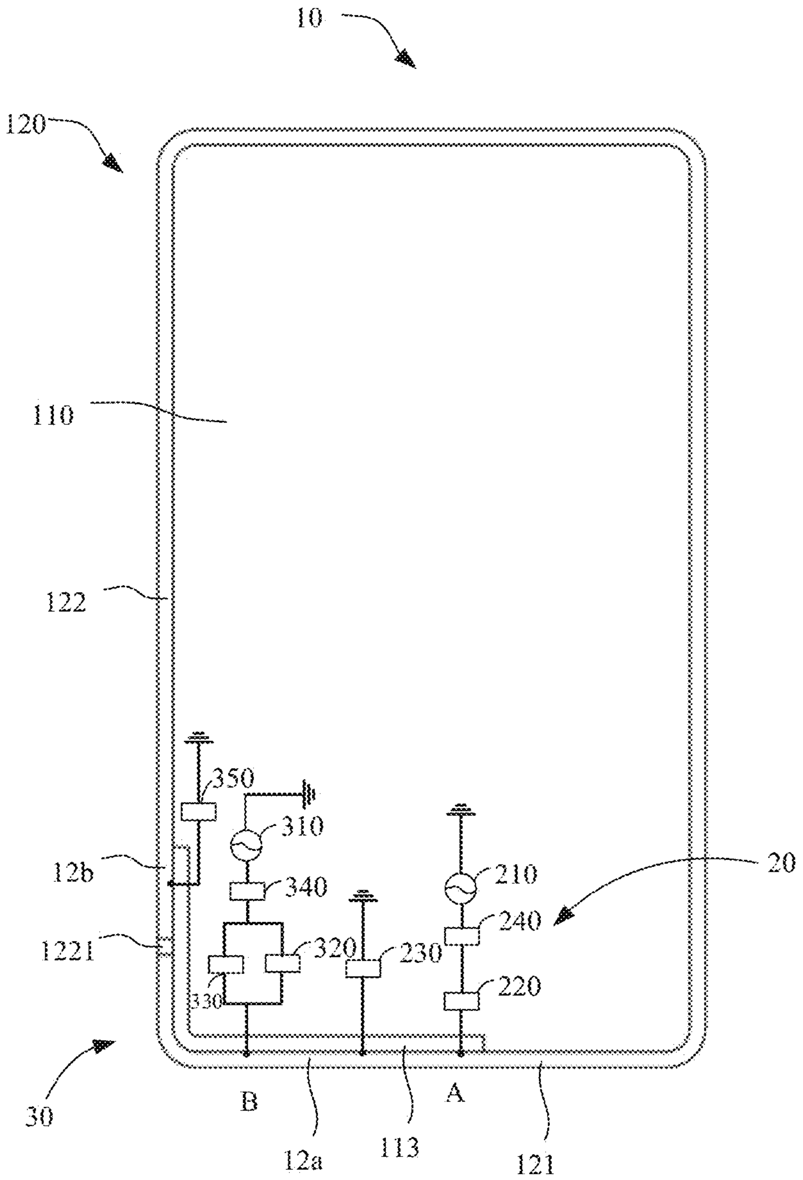
FIG. 12 is a schematic diagram of a first antenna and a second antenna of an electronic device provided in yet another implementation of the present disclosure.

Reference can be made to FIG. 12, which is a schematic diagram of a first antenna and a second antenna of an electronic device provided in yet another implementation of the present disclosure. In the implementations, the electronic device 1 further includes a second adjusting circuit 230. The second adjusting circuit 230 has one end electrically coupled with the first branch 12*a* and another end grounded, and the second adjusting circuit 230 is configured to adjust a range of the first frequency band.

Specifically, a coupling point where the second adjusting circuit 230 is electrically coupled with the first branch 12*a* is located between the first feeding point A and the second feeding point B.

In an implementation, the electronic device 1 further includes an impedance matching circuit 240. The impedance matching circuit 240 has one end electrically coupled with the first excitation source 210 and another end electrically coupled with the first filtering circuit 220, and the impedance matching circuit 240 is configured to match an output impedance of the first excitation source 210 and an input impedance of the first branch 12*a*. The impedance matching circuit 240 is configured to match the output impedance of the first excitation source 210 and the input impedance of the first branch 12*a*, such that the first excitation signal generated by the first excitation source 210 is transmitted to the first branch 12*a* with a relatively high efficiency, to be involved in radiation of the generated electromagnetic wave signal of the first frequency band.

Figure 13:
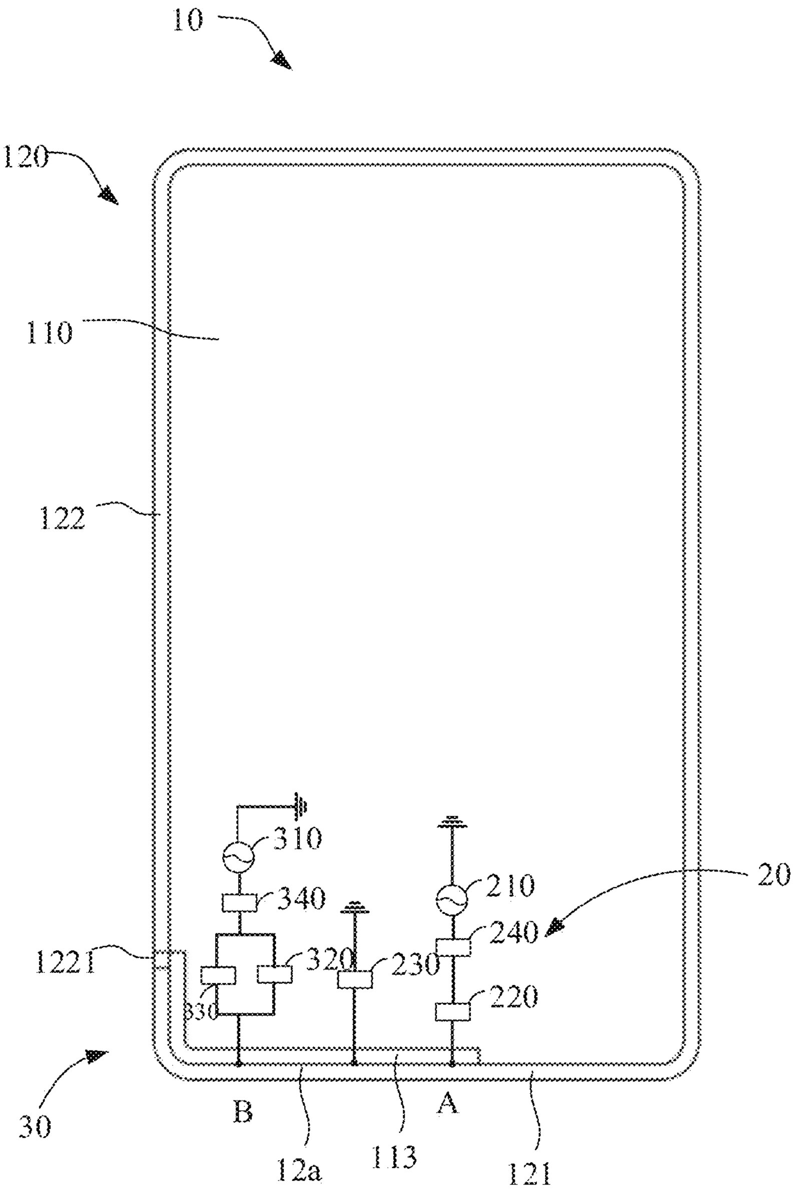
FIG. 13 is a schematic diagram of a first antenna and a second antenna of an electronic device provided in yet another implementation of the present disclosure.

Reference can be made to FIG. 13, which is a schematic diagram of a first antenna and a second antenna of an electronic device provided in yet another implementation of the present disclosure. In the schematic diagram of the implementation, the second gap 1221 is defined corresponding to an end portion of the first gap 113. Specifically, in the implementations, the first gap 113 is defined corresponding to the first edge frame 121 and the second edge frame 122. The second gap 1221 is defined at the second edge 122. In this case, the second antenna 30 does not include the second branch 12*b*.

Figure 14:
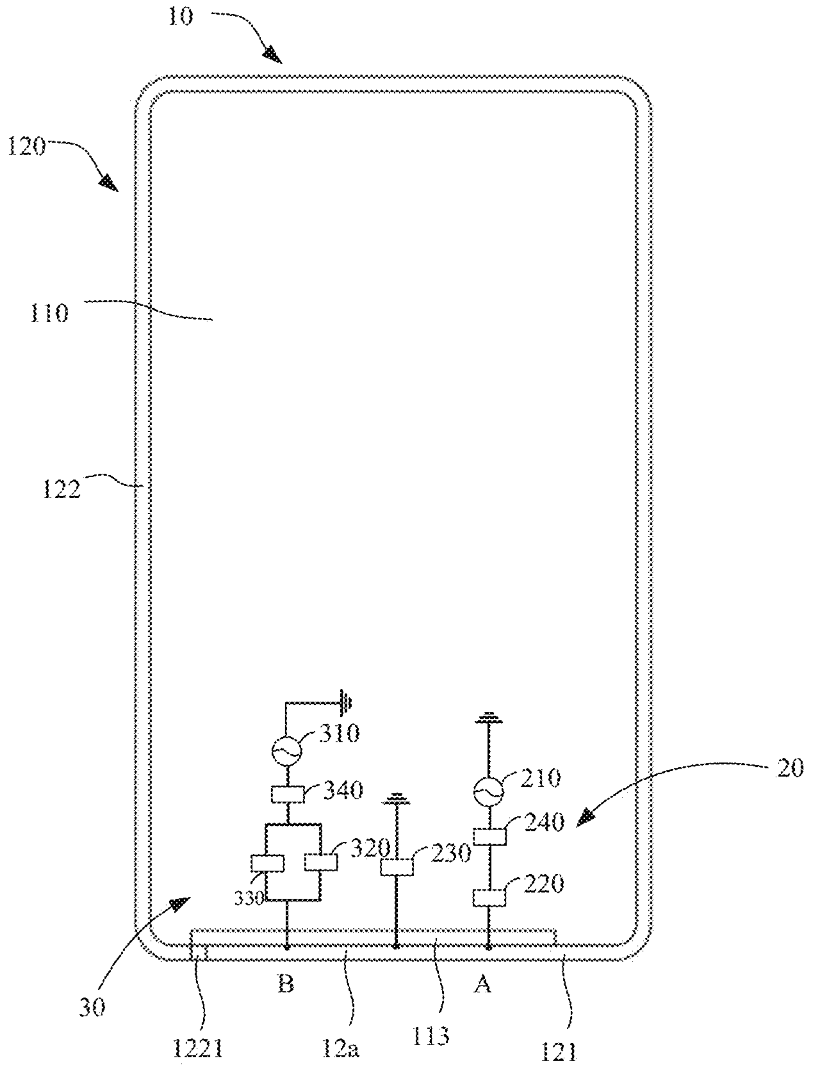
FIG. 14 is a schematic diagram of a first antenna and a second antenna of an electronic device provided in yet another implementation of the present disclosure.

Reference can be made to FIG. 14, which is a schematic diagram of a first antenna and a second antenna of an electronic device provided in yet another implementation of the present disclosure. In the implementations, the first gap

113 is only defined corresponding to the first edge frame 121, the second gap 1221 is also defined at the first edge frame 121, and the second gap 1221 is also defined corresponding to the end portion of the first gap 113. In this case, the second antenna 30 does not include the second branch 12*b*.

Figure 15:
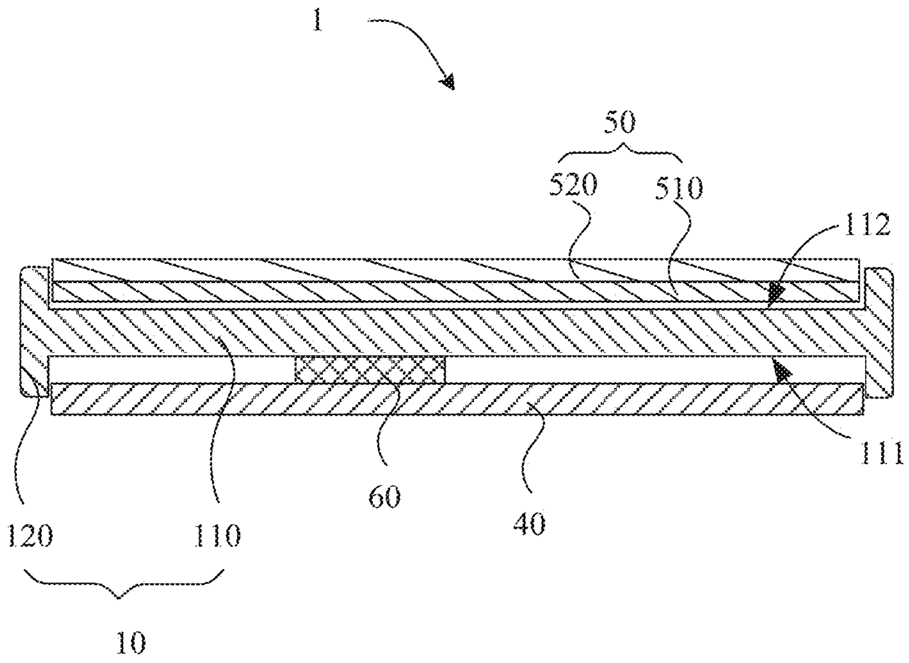
FIG. 15 is a schematic cross-sectional diagram of an electronic device provided in another implementation of the present disclosure, taken along line I-I.

Reference can be made to FIG. 15, FIG. 1, FIG. 2, and other related accompanying drawings together, and FIG. 15 is a schematic cross-sectional diagram of an electronic device provided in another implementation of the present disclosure, taken along line I-I. The electronic device 1 includes a middle frame 10, a circuit board 60, a battery cover 40, and a screen 50. The middle frame 10 includes a middle-frame body 110 and an edge frame 120 connected with a periphery of the middle-frame body 110. The middle-frame body 110 includes a first surface 111 and a second surface 112 opposite to the first surface 111. The circuit board 60 and the battery cover 40 are arranged on the first surface 111 in sequence. The screen 50 is arranged on the second surface 112. The middle-frame body 110 defines a first gap 113 penetrating through the first surface 111 and the second surface 112, the first gap 113 is corresponding to at least one edge frame 120, a surface of the frame 120 away from the middle-frame body 110 constitutes a partial appearance surface of the electronic device 1, and the at least one edge frame 120 corresponding to the first gap 113 further defines a second gap 1221 penetrating through the appearance surface. The second gap 1221 communicates with the first gap 113 to divide the at least one edge frame 120 to form a first branch 12*a*. The first branch 12*a* includes a first feeding point A and a second feeding point B spaced apart from the first feeding point A. The circuit board 60 is electrically coupled with the first branch 12*a* through the first feeding point A to receive and transmit an electromagnetic wave signal of a first frequency band through the first branch 12*a*. The circuit board 60 is electrically coupled with the first branch 12*a* through the second feeding point B to receive and transmit an electromagnetic wave signal of a second frequency band through the first branch 12*a*.

The edge frame 120 defining the second gap 1221 is sandwiched between the screen 50 and the battery cover 40. The surface of the edge frame 120 defining the second gap 1221 and away from the middle-frame body 110 constitutes the partial appearance surface of the electronic device 1.

The screen 50 refers to a component of the electronic device 1 configured to display texts, images, videos, and other contents. The screen 50 may be a component only having a display function, or a component integrated with a display and touch function. In the implementations, the screen 50 also includes a screen body 510 and a cover plate 520 arranged at a side of the screen body 510 away from the middle-frame body 110, and the screen body 510 is configured to display texts, images, video, and other contents of the electronic device 1. The cover plate 520 is configured to protect the screen body 510.

The battery cover 40 may be made of non-metallic materials such as glass, ceramics, etc. The battery cover 40 and the screen 50 are arranged on two opposite surfaces of the middle-frame body 110. The two surfaces are two surfaces through which the first gap 113 penetrates.

Compared with the related art, in the electronic device 1 of the present disclosure, the middle frame 10 is used as the first branch 12*a*, and the first branch 12*a* is used to form the radiator of the first antenna 20 and the second antenna 30, and an interference between the first antenna 20 and the second antenna 30 is avoided by the first filtering circuit 220 and the second filtering circuit 320, thus realizing isolation between the first antenna 20 and the second antenna 30. Therefore, the electronic device 1 of the present disclosure can realize relatively large frequency-band coverage in a limited space, realize a relatively large bandwidth, and have a relatively high communication performance.

In addition, in the present disclosure, the first branch 12*a* only defines one second gap 1221 on the edge frame 120, and when the surface of the edge frame 120 defining the second gap 1221 and away from the middle-frame body 110 constitutes the partial appearance surface of the electronic device 1, the electronic device 1 has a relatively high appearance integrity.

In an implementation, the frequency of the first frequency band is less than the frequency of the second frequency band, and the circuit board 60 is provided with a first excitation source 210, a first filtering circuit 220, a second excitation source 310, and a second filtering circuit 320. The first excitation source 210 is electrically coupled with the first filtering circuit 220, the first filtering circuit 220 is electrically coupled with the first feed point A, the second excitation source 310 is electrically coupled with the second filtering circuit 320, the second filtering circuit 320 is electrically coupled with the second feed point B, the first filtering circuit 220 is a low-pass filtering circuit, and the second filtering circuit 320 is a band-stop filtering circuit.

Reference of the first excitation source 210, the first filtering circuit 220, the second excitation source 310, and the second filtering circuit 320, can be made to the above related descriptions, which will not be repeated herein.

In an implementation, the circuit board 60 is further provided with a switching circuit 330, the switching circuit 330 is coupled in parallel with the second filtering circuit 320, and the switching circuit 330 is configured to adjust a range of the second frequency band.

In an implementation, a length between the second feeding point B and an end of the first branch 12*a* adjacent to the second gap 1221 is: $(\lambda_{20}/4)\pm 5$ mm, $\lambda_{20}$ being a wavelength corresponding to a center frequency of an electromagnetic wave signal of the second frequency band.

In an implementation, the circuit board 60 is further provided with a voltage divider circuit 340. The voltage divider circuit 340 has one end electrically coupled with the second excitation source 310 and another end electrically coupled with the second filtering circuit 320, and the voltage divider circuit 340 coordinates with the second filtering circuit 320 to make a voltage applied to two ends of the switching circuit 330 less than a preset voltage.

In an implementation, the voltage divider circuit 340 and the second filtering circuit 320 each include an inductor.

In an implementation, the frequency of the first frequency band is less than the frequency of the second frequency band, the first branch 12*a* has a length of $(\lambda_{10}/4)\pm 5$ mm, bio being a wavelength corresponding to a center frequency of an electromagnetic wave signal of the first frequency band.

When the first branch has the length of $(\lambda_{10}/4)\pm 5$ mm, the length of the first branch 12*a* matches the central frequency point of the transmitted and received electromagnetic wave signal of the first frequency band, such that the first branch 12*a* has a relatively great reception and transmission effect when receiving and transmitting the electromagnetic wave signal of the first frequency band. It can be understood that the first antenna 20 is an inverted-F antenna (IFA) with a quarter wavelength. In this case, through an adjustment function of a second adjusting circuit, the first antenna 20 can completely cover a low frequency band of 0.7~0.96 GHz.

In an implementation, the edge frame 120 includes a first edge frame 121 and a second edge frame 122 which are connected in a bent manner, the first gap 113 is corresponding to a part of the first edge frame 121 and a part of the second edge frame 122, the second gap 1221 is defined at the second edge frame 122, the part of the second edge frame 122 corresponding to the first gap 113 is divided by the second gap 1221 into a first part 122*a* and a second part 122*b* (reference can be made to FIG. 7). The first part 122*a* is connected with the first edge frame 121, the first branch 12*a* includes the first part 122*a* and the part of the first edge frame 121 corresponding to the first gap 113, and the second part 122*b* constitutes the second branch 12*b*. The circuit board 60 is further provided with a first adjusting circuit 350, the first adjusting circuit 350 is electrically coupled with the second branch 12*b*, the first adjusting circuit 350 is configured to adjust a frequency band of an electromagnetic wave signal received and transmitted by the second excitation source 310 through the second branch 12*b*, and a frequency band of an electromagnetic wave signal received and transmitted by the second excitation source 310 through the first branch 12*a* is different from the frequency band of the electromagnetic wave signal received and transmitted by the second excitation source 310 through the second branch 12*b*.

In an implementation, the first edge frame 121 has a length smaller than the second edge frame 122, and the second gap 1221 is defined at a part of the second edge frame 122 adjacent to the first edge frame 121 (reference can be made to FIG. 7).

In the implementations, when a user holds the electronic device 1 by hand, the second gap 1221 can be prevented from being held by the user, thereby avoiding degradation of the communication performance of the first antenna 20 and the second antenna 30 when the second gap 1221 is held.

Figure 16:
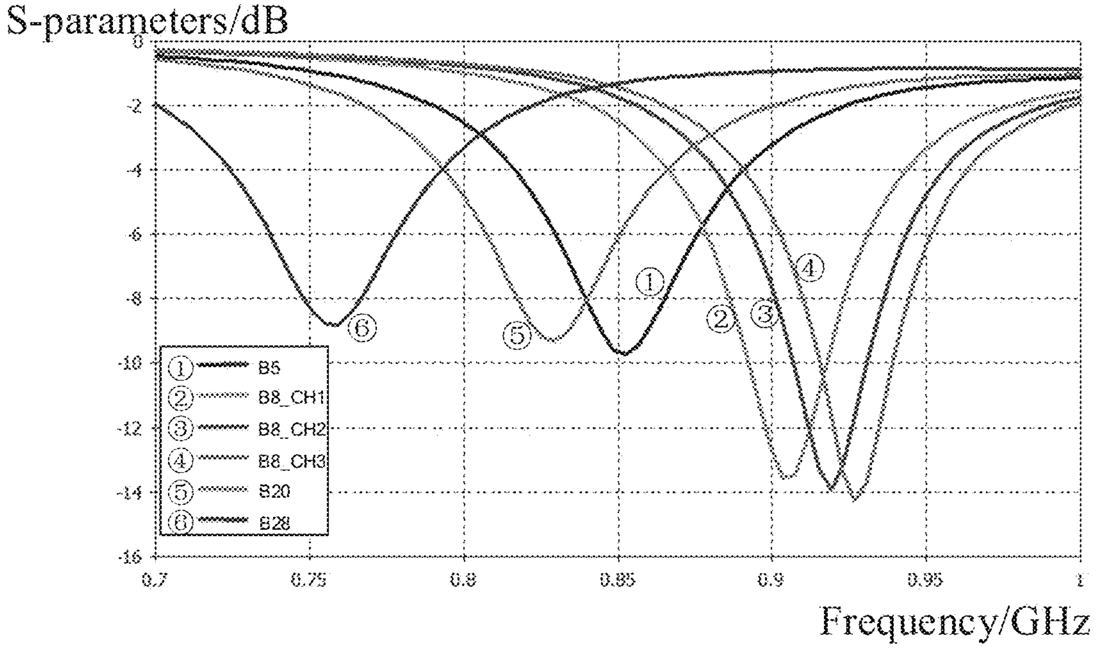
FIG. 16 is a schematic simulation diagram of S-parameters of a first antenna of an electronic device provided in an implementation of the present disclosure.

In order to explain a performance of the electronic device 1 provided in the present disclosure, various parameters of the electronic device 1 provided in the present disclosure are simulated below. Reference can be made to FIG. 16, which is a schematic simulation diagram of S-parameters of a first antenna of an electronic device 1 provided in an implementation of the present disclosure. In the schematic simulation diagram, a horizontal axis represents a frequency in units of GHz, and a vertical axis represents S-parameter in units of decibel (dB). S-parameters are reflection coefficients, and for the antenna, each of S-parameters refers to a ratio of energy reflected back to total energy of an excitation signal generated by an excitation source of an antenna. Lower S-parameters are better, and in this case, for from the excitation signal generated by the excitation source of the antenna, relatively little energy is reflected back, and relatively more energy is involved in radiation. In the schematic simulation diagram, curve ① is a simulation curve of S-parameters of the first antenna 20 in B5 frequency band; curve ② is a simulation curve of S-parameters of the first antenna 20 in B8_CH1 sub-frequency band of B8 frequency band; curve ③ a simulation curve of S-parameters of the first antenna 20 in B8_CH2 sub-frequency band of B8 frequency band; curve ④ a simulation curve of S-parameters of the first antenna 20 in B8_CH3 sub-frequency band of B8 frequency band; curve ⑤ is a simulation curve of S-parameters of the first antenna 20 in B20 frequency band; and curve ⑥ is a simulation curve of S-parameters of the first antenna 20 in B28 frequency band. Taking curve ① as an example, reflection coefficients of the first antenna 20 in B5 frequency band are all less than −4 dB, and it can be seen that the reflection coefficients of the first antenna 20 in B5 frequency band are all relatively small. In other words, the first antenna 20 has relatively little energy reflected back in B5 frequency band and relatively more energy involved in the radiation. Therefore, the first antenna 20 has a relatively great communication effect in B5 frequency band. Similarly, the first antenna 20 also have relatively small reflection coefficients in B8 frequency band, B20 frequency band, and B28 frequency band.

Figure 17:
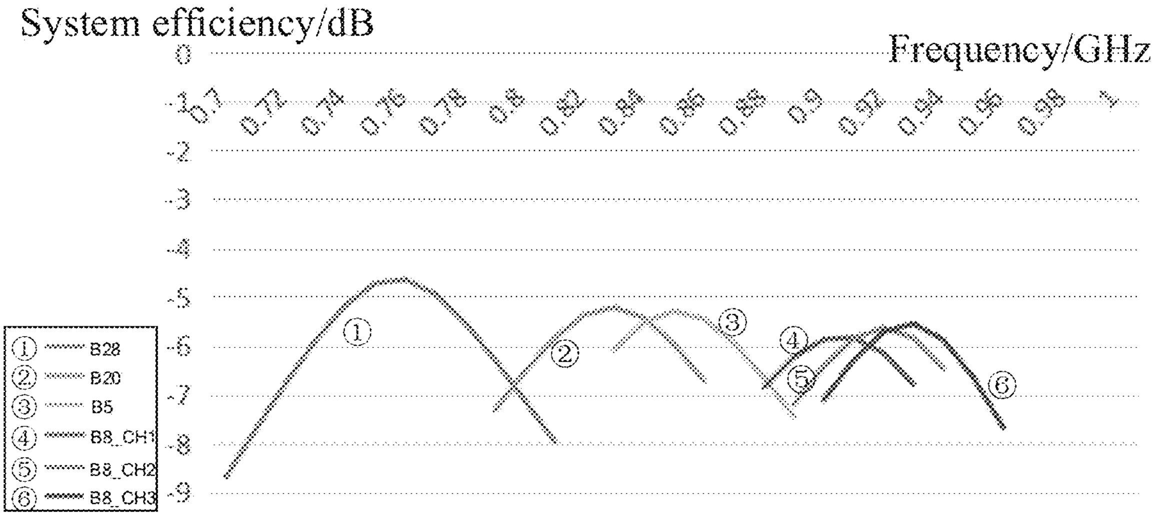
FIG. 17 is a schematic simulation diagram of system efficiencies of a first antenna of an electronic device provided in an implementation of the present disclosure.

Reference can be made to FIG. 17, which is a schematic simulation diagram of system efficiencies of a first antenna of an electronic device provided in an implementation of the present disclosure. A system efficiency is equal to a radiation efficiency multiplied by a reflection coefficient, and higher system efficiency is better. In the schematic diagram, a horizontal axis represents a frequency in units of GHz, and a vertical axis represents a system efficiency in units of dB; curve ① is a simulation curve of the system efficiency of the first antenna 20 in B28 frequency band; curve ② is a simulation curve of the system efficiency of the first antenna 20 in B20 frequency band; curve ③ is the simulation curve of the system efficiency curve of the first antenna 20 in B5 frequency band; curve ④ is a simulation curve of the system efficiency of the first antenna 20 in B8_CH1 sub-frequency band of B8 frequency band; curve ⑤ is a simulation curve of the system efficiency of the first antenna 20 in B8_CH2 sub-frequency band of B8 frequency band; and curve ⑥ is a simulation curve of the system efficiency of the first antenna 20 in B8_CH3 sub-frequency band of B8 frequency band. Taking curve ① as an example, the system efficiency of B28 frequency band is about −4.5 dB, and it can be seen that the first antenna 20 has a relatively high system efficiency in B28 frequency band. Similarly, the first antenna 20 has relatively high system efficiencies in B20 frequency band, B5 frequency band, and B8 frequency band.

Figure 18:
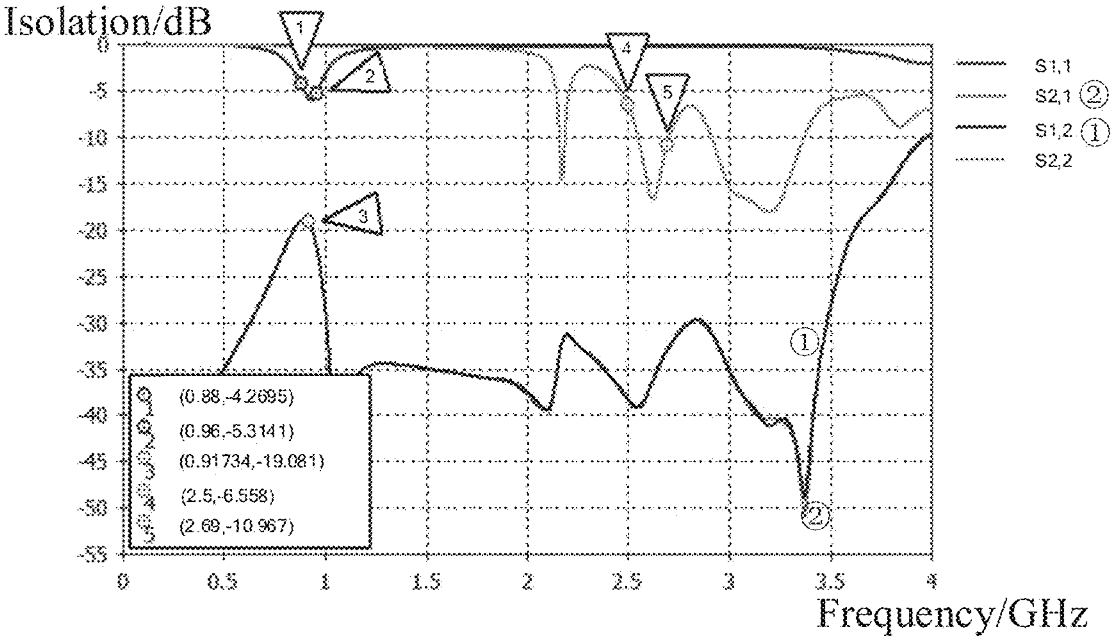
FIG. 18 is a schematic simulation diagram of isolation between a first antenna and a second antenna of an electronic device provided in an implementation of the present disclosure.

Reference can be made to FIG. 18, which a schematic simulation diagram of isolation between a first antenna and a second antenna of an electronic device provided in an implementation of the present disclosure. In the schematic diagram, a horizontal axis represents a frequency in units of GHz, and a vertical axis represents isolation in units of dB; curve ① represents an energy transmitted from the second antenna 30 to the first antenna 20; and curve ② represents an energy transmitted from the first antenna 20 to the second antenna 30. In this diagram, curve ① and curve ② basically coincide. In the schematic diagram, smaller vertical axis number is better, and smaller number represents higher isolation. It can be seen from point 3 in the schematic diagram, the numbers are (0.91734, −19.081). It can be seen that most of the isolation of the first antenna 20 and the second antenna 30 are less than −19 dB, that is, the first antenna 20 and the second antenna 30 have relatively great isolation.

Figure 19:
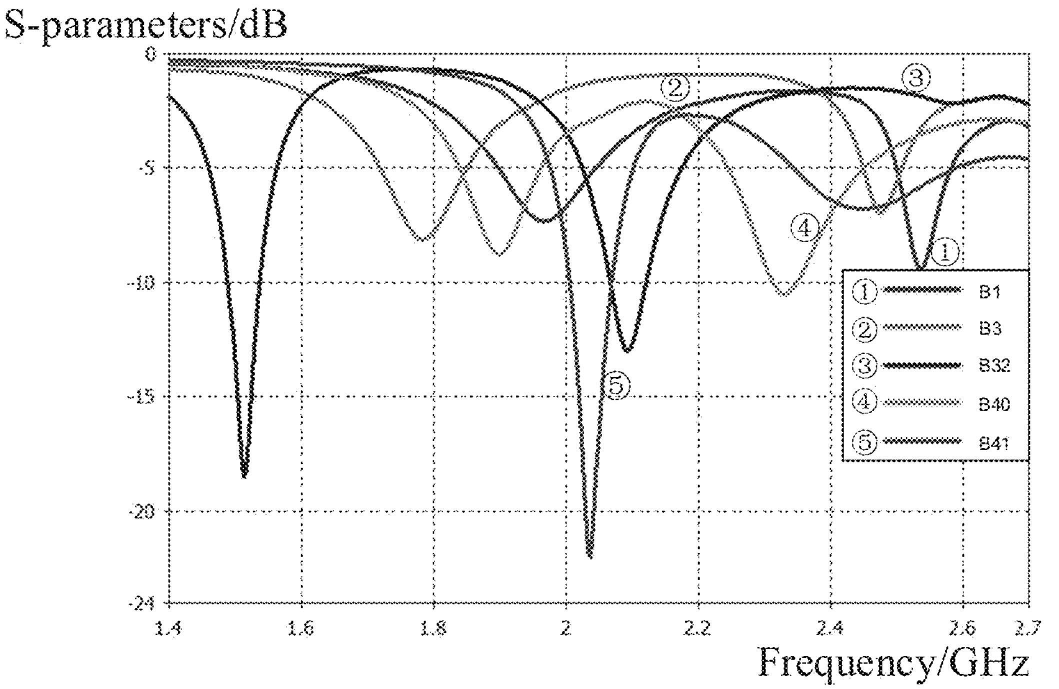
FIG. 19 is a schematic simulation diagram of S-parameters of a second antenna of an electronic device provided in an implementation of the present disclosure.

Reference can be made to FIG. 19, which is a schematic simulation diagram of S-parameters of a second antenna of an electronic device provided in an implementation of the present disclosure. In the schematic simulation diagram, the horizontal axis represents the frequency in units of GHz, and the vertical axis represents S-parameters in units of dB. S-parameters are reflection coefficients, and for the antenna, each of S-parameters refers to the ratio of the energy reflected to the total energy of the excitation signal generated by the excitation source of the antenna. Lower S-parameters are better, and in this case, for from the excitation signal generated by the excitation source of the antenna, relatively little energy is reflected back, and relatively more energy is involved in radiation. In the schematic simulation diagram, curve ① is a simulation curve of S-parameters of the second antenna 30 in B1 frequency band; curve ② is a simulation curve of S-parameters of the second antenna 30 in B3 frequency band; curve ③ a simulation curve of S-parameters of the second antenna 30 in B32 frequency band; curve ④ is a simulation curve of S-parameters of the second antenna 30 in B40 frequency band; and curve ⑤ is a simulation curve of S-parameters of the second antenna 30 in B41 frequency band. Taking curve ① as an example, S-parameters of the second antenna 30 in B1 frequency band are less than −4 dB. It can be seen that the reflection coefficients of the second antenna 30 in B1 frequency band are all relatively small. In other words, the second antenna 30 has relatively little energy reflected back in B1 frequency band and relatively more energy involved in the radiation. Therefore, the second antenna 30 has a relatively great communication effect in B1 frequency band. Similarly, the second antenna 30 also have relatively small reflection coefficients in B3 frequency band, B32 frequency band, B40 frequency band, and B41 frequency band.

Figure 20:
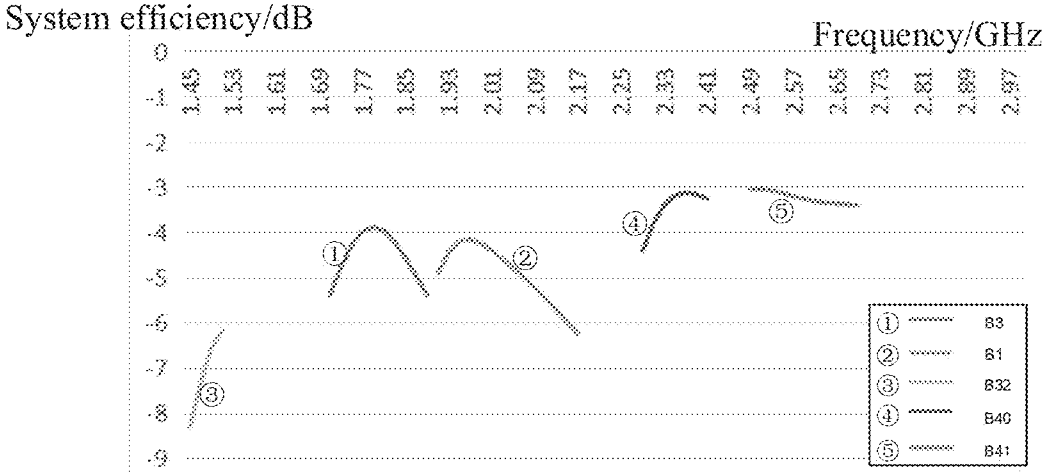
FIG. 20 is a schematic simulation diagram of system efficiencies of a second antenna of an electronic device provided in an implementation of the present disclosure.

Reference can be made to FIG. 20, which is a schematic simulation diagram of system efficiencies of a second antenna of an electronic device provided in an implementation of the present disclosure. The system efficiency is equal to the radiation efficiency multiplied by the reflection coefficient, and higher the system efficiency is better. In the schematic diagram, the horizontal axis represents the frequency in units of GHz, and the vertical axis represents the system efficiency in units of dB; curve ① is a simulation curve of the system efficiency of the second antenna 30 in B3 frequency band; curve ② is a simulation curve of the system efficiency of the second antenna 30 in B1 frequency band; curve ③ is the simulation curve of the system efficiency curve of the second antenna 30 in B32 frequency band; curve ④ is a simulation curve of the system efficiency of the second antenna 30 in B40 frequency band; and curve ⑤ is a simulation curve of system efficiency of the second antenna 30 in B41 frequency band. In the simulating diagram, taking curve ① as an example, the system efficiency of B3 frequency band is about −4 dB, and it can be seen that the second antenna 30 has a relatively high system efficiency in B3 frequency band. Similarly, the second antenna 30 has relatively high system efficiencies in B1 frequency band, B32 frequency band, B40 frequency band, and B41 frequency band.

Figure 21:
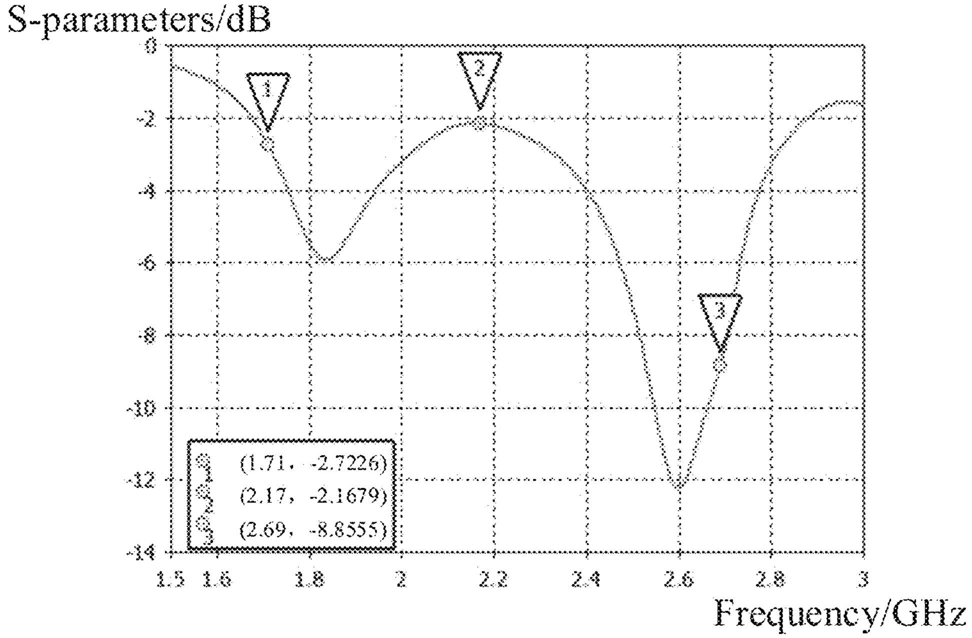
FIG. 21 is a schematic simulation diagram of S-parameters of a second antenna of an electronic device which includes a second branch provided in an implementation of the present disclosure.

Reference can be made to FIG. 21, which is a schematic simulation diagram of S-parameters of a second antenna of an electronic device which includes a second branch provided in an implementation of the present disclosure includes a second branch. In the schematic simulation diagram, the horizontal axis represents the frequency in units of GHz, and the vertical axis represents S-parameters in units of dB. S-parameters are reflection coefficients, and for the antenna, each of S-parameters refers to the ratio of the energy reflected back to the total energy of the excitation signal generated by the excitation source of the antenna. Lower S-parameters are better, and in this case, for from the excitation signal generated by the excitation source of the antenna, relatively little energy is reflected back, and relatively more energy is involved in radiation. In the schematic simulation diagram, S-parameters of the second antenna 30 in a frequency band of 1.71 GHz-2.69 GHz are all less than −2 dB, that is, S-parameters of the second antenna 30 in the 1.71 GHz-2.69 GHz are relatively small. It can be seen that the second antenna 30 covers a relatively wide frequency band while taking account of S-parameters. Therefore, the electronic device 1 of the present disclosure has a relatively large bandwidth and a relatively great communication quality in the second frequency band where the second antenna 30 operates.

Figure 22:
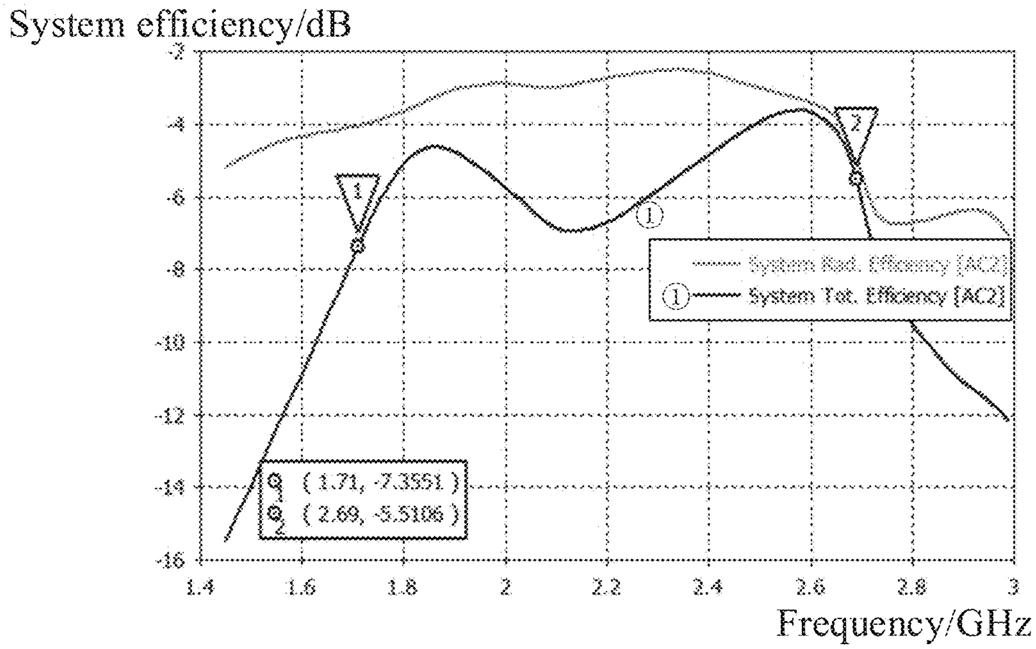
FIG. 22 is a schematic simulation diagram of system efficiencies of a second antenna of an electronic device which includes a second branch provided in an implementation of the present disclosure.

Reference can be made to FIG. 22, which is a schematic simulation diagram of system efficiencies of a second antenna of an electronic device which includes a second branch provided in an implementation of the present disclosure includes a second branch. In the schematic diagram, the horizontal axis represents the frequency in units of GHz, and the vertical axis represents the system efficiency in units of dB; and higher the system efficiency is better. Curve ① is a simulation curve of the system efficiency when the second antenna 30 includes the second branch **12*b*. Point 1 corresponds to a system efficiency of the second antenna 30 at a lowest frequency point of B3 frequency band, and point 2 corresponds to a system efficiency of the second antenna 30 at a highest frequency point of B41 frequency band. When the second antenna 30 includes the second branch 12*b*, a corresponding frequency band is between point 1 and point 2, the system efficiency is greater than or equal to −7.3 dB, and the second antenna 30** has a relatively high system efficiency.

It can be seen from the above various schematic simulation diagrams together that the first antenna 20 and the second antenna 30 have relatively great isolation, and the first antenna 20 and the second antenna 30 each have relatively small S-parameters and relatively high system efficiencies. Therefore, the electronic device 1 of the present disclosure has a relatively great communication effect.

It can be understood that in the above various implementations of the present disclosure, for example, the electronic device 1 includes the middle frame 10, and the first antenna 20 and the second antenna 30 are formed on the middle frame 10. However, the above implementations should not be understood as limitations to the present disclosure. The first branch **12*a* and the second branch 12*b* of the first antenna 20 and the second antenna 30 may also be formed on other components. For example, when the electronic device 1 includes a conductive battery cover 40 (e.g., a metal battery cover), the first branch 12*a* and the second branch 12*b* of the first antenna 20 and the second antenna 30 may also be formed on the battery cover 40. The conductive battery cover 40 and the middle frame 10 are only specific forms of the housing of the electronic device 1. The housing is not limited to the conductive battery cover 40 and the middle frame 10 of the electronic device 1, as long as the first branch 12*a* and the second branch 12*b* of the first antenna 20 and of the second antenna 30** can be formed.

Figure 23:
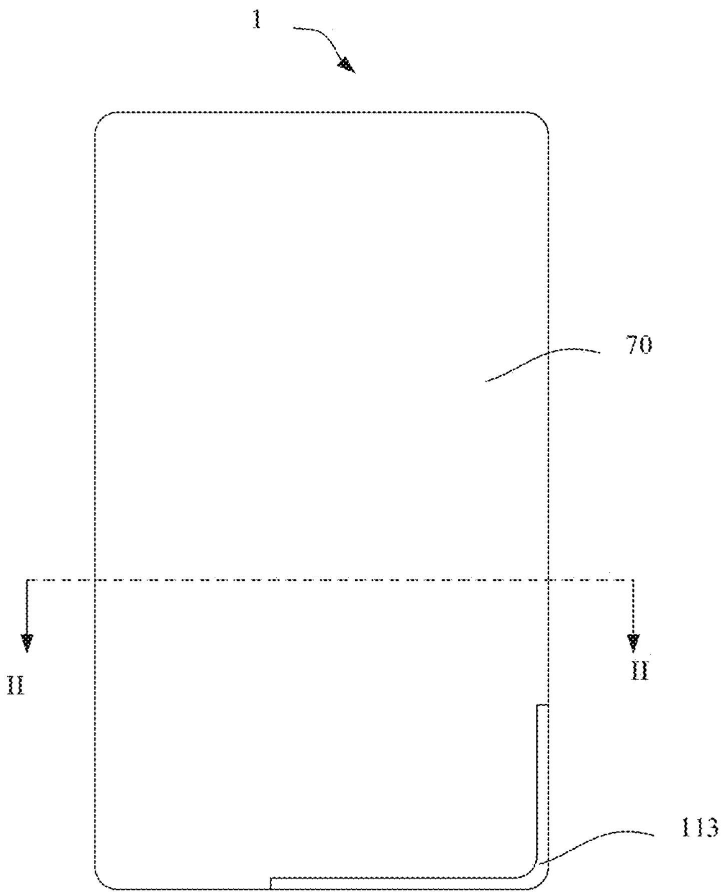
FIG. 23 is a back side schematic diagram of an electronic device provided in an implementation of the present disclosure.
Figure 24:
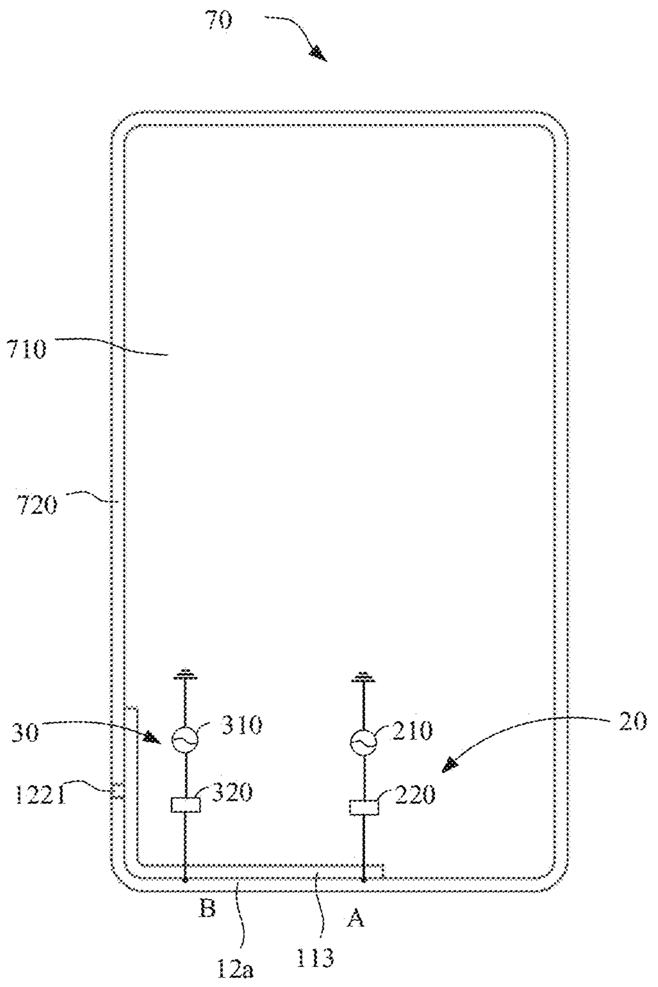
FIG. 24 is a schematic diagram of an inner surface of a battery cover of an electronic device of the present disclosure.
Figure 25:
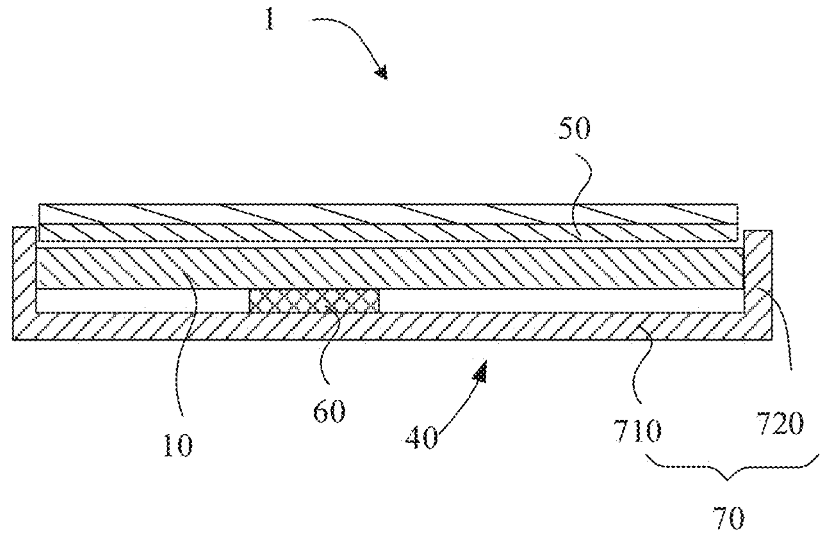
FIG. 25 is a schematic cross-section diagram, taken along line II-II in FIG. 23.

When a housing where the first branch **12*a* and the second branch 12*b* of first antenna 20 and the second antenna 30 are formed is the conductive battery cover 40 of the electronic device 1, it is consistent with a case that a housing where the first branch 12*a* and the second branch 12*b* of first antenna 20 and the second antenna 30 are formed is the middle frame 10. The following will be explained in combination with FIG. 23 to FIG. 25. Specifically, reference can be made to FIG. 23, FIG. 24, FIG. 25 together, where FIG. 23 is a back side schematic diagram of an electronic device provided in an implementation of the present disclosure; FIG. 24 is a schematic diagram of an inner surface of a battery cover of an electronic device of the present disclosure; and FIG. 25 is a schematic cross-section diagram, taken along line II-II in FIG. 23. The housing 70 includes a body 710 and an edge frame 720 connected with a periphery of the body 710, the body 710 defines a first gap 113 at the periphery of the body 710 and the first gap 113 penetrates through two opposite surfaces of the body 710, the first gap 113 is configured to separate at least a part of the edge frame 720 from the body 710, the edge frame 720 defines a second gap 1221, and the second gap 1221 communicates with the first gap 113. The edge frame 720 is divided by the second gap 1221 to form a first branch 12***a*, and the first branch 12*a* has a first feeding point A and a second feeding point B spaced apart from the first feeding point A. A length of the first branch 12*a* between the second feeding point B and an end of the first branch 12*a* adjacent to the second gap 1221 is shorter than a length of the first branch 12*a* between the second feeding point B and an end of the first branch 12*a* away from the second gap 1221. A first excitation source 210 is electrically coupled with the first feeding point A and configured to feed a first excitation signal to the first branch 12*a*, to excite the first branch 12*a* to resonate in a first frequency band. A second excitation source 310 is electrically coupled with the second feeding point B and configured to feed a second excitation signal to the first branch 12*a*, to excite the first branch 12*a* to resonate in a second frequency band. The second frequency band is higher than the first frequency band. The second antenna 30 includes the second excitation source 310 and the first branch 12*a*. A first filtering circuit 220 is electrically coupled between the first excitation source 210 and the first feeding point A, and is configured to filter an interference of an electromagnetic wave signal of the second frequency band to the first excitation source 210. A second filtering circuit 320 is electrically coupled between the second excitation source 310 and the second feeding point B, and is configured to filter an interference of an electromagnetic wave signal of the first frequency band to the second excitation source 310.

Compared with the related art, in the electronic device 1 of the present disclosure, the housing 70 is used to form the first branch 12*a*, and the first branch 12*a* is used to form a radiator of the first antenna 20 and the second antenna 30, and an interference between the first antenna 20 and the second antenna 30 is avoided by the first filtering circuit 220 and the second filtering circuit 320, thus realizing isolation between the first antenna 20 and the second antenna 30. Therefore, the electronic device 1 of the present disclosure can realize relatively large frequency-band coverage in a limited space, realize a relatively large bandwidth, and have a relatively high communication performance.

When the housing 70 is the conductive battery cover 40, the housing 70 defines an accommodating space, and the accommodating space is used to accommodate the middle frame 10, the circuit board 60, and the screen 50. The circuit board 60 is arranged at a side of the middle frame 10 facing the battery cover 40, and the screen 50 is arranged at a side of the circuit board 60 away from the middle frame 10. Circuits of the first antenna 20 and the second antenna 30 are all arranged on the circuit board 60. For example, the first excitation source 210, the first filtering circuit 220, the second excitation source 310, and the second filtering circuit 320 are all arranged on the circuit board 60.

It can be understood that when the housing 70 is the conductive battery cover 40, the electronic device 1 also includes various circuits and sub-circuits when the housing 70 is the middle frame 10. Reference of the various circuits can be made to the above descriptions, which will not be repeated herein. When the housing 70 is the conductive battery cover 40, relationships between the first gap 113 and other components of the housing 70 and relationships between the second gap 1221 and other components of the housing 70 are identical to those of the implementations when the housing 70 is the middle frame 10, which will not be repeated herein.

It can be understood that in the specific implementations of the background technology of the present disclosure, for example, the first antenna 20 operates in the first frequency band and the first frequency band is: 0.7 GHz≤f1≤0.96 GHz, and the second antenna 30 operates in the second frequency band and the second frequency band is: 1.45 GHz≤f2≤2.69 GHz. The above introduction of the first antenna 20 and the second antenna 30 cannot be understood as limitations to the first antenna 20 and the second antenna 30 of the present disclosure. In other implementations, the first antenna 20 and the second antenna 30 may also be antennas supporting other frequency bands.

Although the implementations of the present disclosure have been shown and described above, it can be understood that the above implementations are exemplary and cannot be understood as limitations to the present disclosure. Those of ordinary skill in the art can change, amend, replace, and modify the above implementations within the scope of the present disclosure, and these modifications and improvements are also regarded as the protection scope of the present disclosure.

What is claimed is:

1. An electronic device, comprising:

a housing comprising a body and an edge frame connected with the body at a periphery of the body, wherein the body defines a first gap penetrating through two opposite surfaces of the body, the edge frame defines a second gap, the second gap communicates with the first gap, the edge frame is divided by the second gap to form a first branch, and the first branch has a first feeding point and a second feeding point spaced apart from the first feeding point, wherein a length of the first branch between the second feeding point and an end of the first branch adjacent to the second gap is shorter than a length of the first branch between the second feeding point and an end of the first branch away from the second gap;

a first excitation source electrically coupled with the first feeding point and configured to feed a first excitation signal to the first branch, to excite the first branch to resonate in a first frequency band;

a second excitation source electrically coupled with the second feeding point and configured to feed a second excitation signal to the first branch, to excite the first branch to resonate in a second frequency band, wherein the second frequency band is higher than the first frequency band;

a first filtering circuit electrically coupled between the first excitation source and the first feeding point, and configured to filter an interference of an electromagnetic wave signal of the second frequency band to the first excitation source;

a second filtering circuit electrically coupled between the second excitation source and the second feeding point, and configured to filter an interference of an electromagnetic wave signal of the first frequency band to the second excitation source; and a switching circuit coupled in parallel with the second filtering circuit and configured to adjust a range of the second frequency band.

2. The electronic device of claim 1, wherein a length of the first branch between the second feeding point and an end of the first branch adjacent to the second gap is: $(\lambda_{20}/4)\pm5$ mm, $\lambda_{20}$ being a wavelength corresponding to a center frequency of the electromagnetic wave signal of the second frequency band.

3. The electronic device of claim 1, further comprising:
a voltage divider circuit, wherein the voltage divider circuit has one end electrically coupled with the second excitation source and another end electrically coupled with one of two coupling points not coupled with the first branch.

4. The electronic device of claim 3, wherein the voltage divider circuit is configured to coordinate with the second filtering circuit to make a voltage applied to two ends of the switching circuit less than a preset voltage.

5. The electronic device of claim 3, wherein the voltage divider circuit and the second filtering circuit each comprise an inductor.

6. The electronic device of claim 1, wherein the switching circuit comprises a switch and a plurality of adjusting sub-circuits, at least one or all of the plurality of adjusting sub-circuits is electrically coupled with the first branch through the switch, and the plurality of adjusting sub-circuits are configured to adjust the range of the second frequency band.

7. The electronic device of claim 1, wherein the second gap is defined corresponding to a non-end portion of the first gap.

8. The electronic device of claim 7, wherein the edge frame is further divided by the second gap to form a second branch, the electronic device further comprises an adjusting circuit, the adjusting circuit has one end electrically coupled with the second branch and another end grounded, a frequency band of an electromagnetic wave signal received and transmitted through the second branch is different from a frequency band of an electromagnetic wave signal received and transmitted through the first branch, and the adjusting circuit is configured to adjust the frequency band of the electromagnetic wave signal received and transmitted through the second branch.

9. The electronic device of claim 7, wherein the edge frame comprises a first edge frame and a second edge frame which are connected in a bent manner, the first gap is corresponding to the first edge frame and the second edge frame, the second gap is defined at the second edge frame, a part of the second edge frame corresponding to the first gap is divided by the second gap into a first part and a second part, the first part is connected with the first edge frame, the first branch comprises the first part and a part of the first edge frame corresponding to the first gap, and the second part constitutes the second branch.

10. The electronic device of claim 9, wherein the first edge frame has a length smaller than the second edge frame, and the second gap is defined at a part of the second edge frame adjacent to the first edge frame.

11. The electronic device of claim 7, wherein the edge frame is implemented as at least one edge frame, the first gap is defined corresponding to one of the at least one edge frame, and the second gap is defined at the edge frame corresponding to the first gap.

12. The electronic device of claim 1, further comprising:
an adjusting circuit, wherein the adjusting circuit has one end electrically coupled with the first branch and another end grounded, and the adjusting circuit is configured to adjust a range of the first frequency band.

13. The electronic device of claim 1, further comprising:
an impedance matching circuit, wherein the impedance matching circuit has one end electrically coupled with the first excitation source and another end electrically coupled with the first filtering circuit, and the impedance matching circuit is configured to match an output impedance of the first excitation source and an input impedance of the first branch.

14. The electronic device of claim 1, wherein a frequency of the first frequency band is less than a frequency of the second frequency band, the second feeding point is more adjacent to the second gap than the first feeding point, the first filtering circuit is a low-pass filtering circuit, and the second filtering circuit is a band-stop filtering circuit.

15. The electronic device of claim 1, wherein a frequency of a first frequency band is less than a frequency of a second frequency band, the first branch has a length of $(\lambda_{10}/4)\pm5$ mm, $\lambda_{10}$ being a wavelength corresponding to a center frequency of an electromagnetic wave signal of the first frequency band.

16. The electronic device of claim 1, wherein the second gap is defined corresponding to an end portion of the first gap.

17. The electronic device of claim 1, wherein the housing is a middle frame or a battery cover.

18. The electronic device of claim 1, wherein the first filtering circuit comprises a capacitor and an inductor.

19. The electronic device of claim 1, wherein the first frequency band comprises B5 frequency band, B8 frequency band, B20 frequency band, and B28 frequency band, and the second frequency band comprises B1 frequency band, B3 frequency band, B32 frequency band, B40 frequency band, and B41 frequency band.

* * * * *